United States Patent
Ando et al.

(10) Patent No.: US 9,956,888 B2
(45) Date of Patent: May 1, 2018

(54) POWER SUPPLY SYSTEM

(71) Applicant: TOYOTA JIDOSHA KABUSHIKI KAISHA, Toyota-shi, Aichi-ken (JP)

(72) Inventors: Toru Ando, Obu (JP); Makoto Hirai, Shizuoka-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 122 days.

(21) Appl. No.: 15/107,325

(22) PCT Filed: Dec. 22, 2014

(86) PCT No.: PCT/IB2014/002854
§ 371 (c)(1),
(2) Date: Jun. 22, 2016

(87) PCT Pub. No.: WO2015/097527
PCT Pub. Date: Jul. 2, 2015

(65) Prior Publication Data
US 2017/0008415 A1   Jan. 12, 2017

(30) Foreign Application Priority Data

Dec. 25, 2013   (JP) ................................ 2013-267045

(51) Int. Cl.
| | | |
|---|---|---|
| B60L 11/18 | (2006.01) | |
| B60L 11/00 | (2006.01) | |
| B60L 15/20 | (2006.01) | |
| B60L 11/08 | (2006.01) | |
| H02J 7/00 | (2006.01) | |
| H02M 3/08 | (2006.01) | |

(Continued)

(52) U.S. Cl.
CPC ......... B60L 11/1861 (2013.01); B60L 11/005 (2013.01); B60L 11/08 (2013.01);
(Continued)

(58) Field of Classification Search
None
See application file for complete search history.

(56) References Cited

U.S. PATENT DOCUMENTS

2004/0225333 A1* 11/2004 Greatbatch .............. A61N 1/08
607/34
2008/0258685 A1* 10/2008 Choy ...................... H02J 1/102
320/132

(Continued)

FOREIGN PATENT DOCUMENTS

JP   2009-261183 A   11/2009

*Primary Examiner* — Jared Fureman
*Assistant Examiner* — James Evans
(74) *Attorney, Agent, or Firm* — Andrews Kurth Kenyon LLP

(57) ABSTRACT

A power supply system includes a plurality of electrical storage devices, a distributor configured to distribute electric power between the plurality of electrical storage devices in a desired distribution mode, and an electronic control unit. The electronic control unit configured to (i) set the desired distribution mode based on at least one of a magnitude relation between first rates of change in dischargeable power of the corresponding electrical storage device to a charge state value indicating a remaining level of charge of the corresponding electrical storage device, or a magnitude relation between second rates of change in chargeable power of the corresponding electrical storage device to the charge state value, and (ii) control the distributor such that electric power is distributed in the set distribution mode.

7 Claims, 12 Drawing Sheets

(51) Int. Cl.
*H02M 7/44* (2006.01)
*H02P 4/00* (2006.01)

(52) U.S. Cl.
CPC ....... *B60L 11/1809* (2013.01); *B60L 11/1868* (2013.01); *B60L 15/2045* (2013.01); *H02J 7/0068* (2013.01); *H02M 3/08* (2013.01); *H02M 7/44* (2013.01); *H02P 4/00* (2013.01); *B60L 2240/547* (2013.01); *Y02T 10/645* (2013.01); *Y02T 10/7005* (2013.01); *Y02T 10/7022* (2013.01); *Y02T 10/7044* (2013.01); *Y02T 10/7066* (2013.01); *Y02T 10/7072* (2013.01); *Y02T 10/72* (2013.01); *Y02T 10/7283* (2013.01); *Y02T 90/14* (2013.01)

(56) References Cited

U.S. PATENT DOCUMENTS

| | | | |
|---|---|---|---|
| 2009/0058329 A1* | 3/2009 | Ichikawa | B60K 6/26 318/139 |
| 2009/0067202 A1* | 3/2009 | Ichikawa | B60L 11/1868 363/79 |
| 2009/0158056 A1* | 6/2009 | Anderson | H02J 3/46 713/300 |
| 2009/0261658 A1 | 10/2009 | Kato | |
| 2010/0019729 A1* | 1/2010 | Kaita | B60L 11/123 320/134 |
| 2010/0133025 A1* | 6/2010 | Flett | B60K 6/46 180/65.22 |
| 2010/0145533 A1* | 6/2010 | Cardinal | H02J 3/383 700/291 |
| 2012/0277832 A1* | 11/2012 | Hussain | A61N 1/378 607/62 |
| 2015/0149799 A1* | 5/2015 | Ye | G06F 1/263 713/320 |
| 2016/0046203 A1* | 2/2016 | Okamura | B60L 3/0046 701/22 |
| 2016/0049814 A1* | 2/2016 | Sugiyama | H02J 7/0021 320/128 |

* cited by examiner

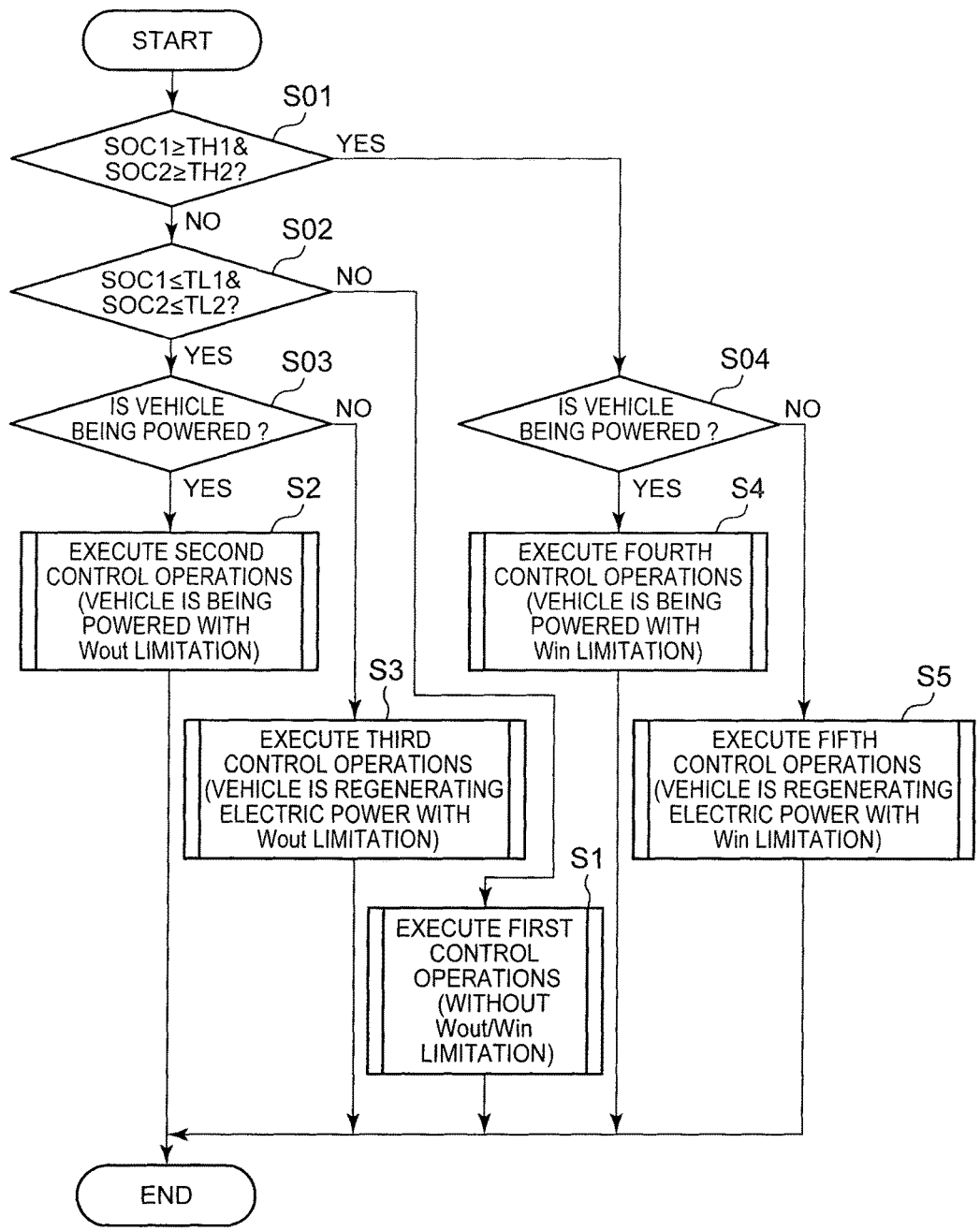

POWER SUPPLY SYSTEM

CROSS-REFERENCE TO RELATED APPLICATIONS

This is a national phase application based on the PCT International Patent Application No. PCT/IB2014/002854 filed Dec. 22, 2014, claiming priority to Japanese Patent Application No. 2013-267045 filed Dec. 25, 2013, the entire contents of both of which are incorporated herein by reference.

BACKGROUND OF THE INVENTION

1. Field of the Invention

The invention relates to a technical field of a power supply system including a plurality of electrical storage means.

2. Description of Related Art

There is known a power supply system including a first electrical storage device, a second electrical storage device and a converter that distributes electric power between these first electrical storage device and second electrical storage device (see, for example, Japanese Patent Application Publication No. 2009-261183 (JP 2009-261183 A)). The first electrical storage device and the second electrical storage device each are, for example, a rechargeable direct-current power supply, such as a secondary battery and a capacitor. Particularly, a power supply system described in JP 2009-261183 A determines a distribution ratio in the following manner. The distribution ratio is the ratio of electric power that is distributed to the first electrical storage device and electric power that is distributed to the second electric storage device. Specifically, the power supply system described in JP 2009-261183 A, when the first electrical storage device and the second electrical storage device are charged, determines a distribution between an electric power that is charged into the first electrical storage device and an electric power that is charged into the second electric storage device (distribution ratio) on the basis of the ratio of an available charge energy of the first electrical storage device and an available charge energy of the second electrical storage device. Each available charge energy is a parameter that is calculated on the basis of a difference between a charge state value (SOC) indicating a current state of charge of the corresponding electrical storage device and a charge state value of the corresponding electrical storage device at the timing at which an electric power (Win) that is chargeable into the corresponding electrical storage device begins to be limited. Similarly, the power supply system described in JP 2009-261183 A, when the first electrical storage device and the second electrical storage device are discharged, determines a distribution between an electric power that is discharged from the first electrical storage device and an electric power that is discharged from the second storage device (distribution ratio) on the basis of the ratio of an available discharge energy of the first electrical storage device and an available discharge energy of the second electrical storage device. Each available discharge energy is a parameter that is calculated on the basis of a difference between a current charge state value of the corresponding electrical storage device and a charge state value of the corresponding electrical storage device at the timing at which an electric power (Wout) that is dischargeable from the corresponding electrical storage device begins to be limited.

SUMMARY OF THE INVENTION

However, when only the distribution ratios are determined on the basis of the ratio of available charge energies and the ratio of available discharge energies, there may occur a situation that the efficiency of the overall power supply system does not become optimal. Specifically, when only the distribution ratios are determined on the basis of the ratio of available charge energies and the ratio of available discharge energies, there may occur a situation that a dischargeable power of the overall power supply system or a chargeable power of the overall power supply system is excessively limited. In other words, for the method of determining the distribution ratios, described in JP 2009-261183 A, there may be room for improvement in terms of suitably ensuring a dischargeable power of the overall power supply system or a chargeable power of the overall power supply system.

As an example, such, situations can occur when the plurality of electrical storage devices have different power supply characteristics. For example, the charge state value of each individual electrical storage device at the timing at which a dischargeable power (Wout) of the corresponding electrical storage device begins to be limited is not always the same among all the electrical storage devices. In this case as well, the power supply system described in JP 2009-261183 A is configured to distribute electric power between the plurality of electrical storage devices uniformly at the distribution ratio that is determined merely on the basis of the ratio of available discharge energies without consideration of a difference in the charge state value of each individual electrical storage device at the timing at which the dischargeable power of the corresponding electrical storage device begins to be limited. As a result, particularly, after the dischargeable power of each individual electrical storage device has begun to be limited, there may occur a situation that the dischargeable power of the overall power supply system is excessively limited. In other words, for a method of determining the distribution ratios, described in JP 2009-261183 A, particularly, after the dischargeable power of each individual electrical storage device has begun to be limited, there may be room for improvement in terms of suitably ensuring the dischargeable power of the overall power supply system. This also applies to the case after the chargeable power (Win) of each individual electrical storage device has begun to be limited.

A task that the invention intends to solve includes the above-described one as an example. The invention provides a power supply system that suitably ensures the dischargeable or chargeable power of an overall power supply system including a plurality of power supplies.

An aspect of the invention provides a power supply system. The power supply system includes a plurality of electrical storage devices, a distributor configured to distribute electric power between the plurality of electrical storage devices in a desired distribution mode, and an electronic control unit. The electronic control unit is configured to set the desired distribution mode based on at least one of a magnitude relation between first rates of change in dischargeable power of the corresponding electrical storage device to a charge state value indicating a remaining level of charge of the corresponding electrical storage device, or a magnitude relation between second rates of change in chargeable power of the corresponding electrical storage device to the charge state value. The electronic control unit is configured to control the distributor such that electric power is distributed in the set distribution mode.

The power supply system includes the plurality of electrical storage devices and the distributor. Each of the plurality of electrical storage devices is a power supply that is able to discharge or charge electric power. The distributor distributes electric power between the plurality of electrical storage devices in the desired distribution mode. For example, the distributor is configured to distribute electric power such that a distribution between electric powers that are respectively discharged from the electrical storage devices becomes a distribution based on the desired distribution mode. Alternatively, for example, the distributor is configured to distribute electric power such that a distribution between electric powers that are respectively charged into the electrical storage devices becomes a distribution based on the desired distribution mode.

The electronic control unit is configured to set the mode (that is, the distribution mode) in which the distributor distributes electric power. Particularly, the electronic control unit is configured to determine the distribution mode on the basis of at least one of the magnitude relation between the first rates of change or the magnitude relation between the second rates of change.

Each of the first rates of change indicates the rate of change in dischargeable power of the corresponding electrical storage device to the charge state value of the corresponding electrical storage device. For example, when the correlation between the dischargeable power and charge state value of an electrical storage device is shown by a graph, the first rate of change of the electrical storage device indicates the slope of the graph. Alternatively, for example, when the dischargeable power of an electrical storage device changes by a second predetermined amount as the charge state value of the electrical storage device changes by a first predetermined amount, the first rate of change of the electrical storage device indicates a value expressed by Second predetermined amount/First predetermined amount. The first rate of change may be directly the rate of change in dischargeable power to the charge state value (that is, the rate of change that takes into consideration the sign) or may be the absolute value of the rate of change in dischargeable power to the charge state value (that is, the rate of change that does not take into consideration the sign).

Each of the second rates of change indicates the rate of change in chargeable power of the corresponding electrical storage device to the charge state value of the corresponding electrical storage device. For example, when the correlation between the chargeable power and charge state value of an electrical storage device is shown by a graph, the second rate of change of the electrical storage device indicates the slope of the graph. Alternatively, for example, when the chargeable power of an electrical storage device changes by a fourth predetermined amount as the charge state value of the electrical storage device changes by a third predetermined amount, the second rate of change of the electrical storage device indicates a value expressed by Fourth predetermined amount/Third predetermined amount. The second rate of change may be directly the rate of change in chargeable power to the charge state value (that is, the rate of change that takes into consideration the sign) or may be the absolute value of the rate of change in chargeable power to the charge state value (that is, the rate of change that does not take into consideration the sign).

The dischargeable power indicates an electric power that is dischargeable from each individual electrical storage device. The electric power that is dischargeable from each individual electrical storage device is an electric power that is allowed to be discharged from each individual electrical storage device or an upper limit value of an electric power that is discharged from each individual electrical storage device. The chargeable power indicates an electric power that is chargeable into each individual electrical storage device. The electric power that is chargeable into each individual electrical storage device is an electric power that is allowed to be charged into each individual electrical storage device or an upper limit value of an electric power that is charged into each individual electrical storage device. The charge state value indicates the remaining level of electric power that is stored in each individual electrical storage device (remaining level of charge).

The electronic control unit is configured to control the distributor such that electric power is distributed in the set distribution mode. As a result, the distributor distributes electric power between the plurality of electrical storage devices in the set distribution mode. That is, the distributor is configured to distribute electric power between the plurality of electrical storage devices on the basis of at least one of the first rates of change (that is, the rates of change in dischargeable power) or the second rates of change (that is, the rates of change in chargeable power).

According to the above aspect, the electronic control unit is able to suitably control the power supply system such that electric power is distributed in consideration of the magnitude relation between the first rates of change (that is, the rates of change in dischargeable power) between the plurality of electrical storage devices. Thus, the electronic control unit is able to, while taking the first rates of change into consideration, control the power supply system (cause the distributor to distribute electric power) such that the dischargeable power of the overall power supply system is relatively difficult to be limited. The electronic control unit is able to, while taking the first rates of change into consideration, cause the distributor to distribute electric power such that the dischargeable power of the overall power supply system is relatively difficult to be limited. That is, the electronic control unit is, able to control the power supply system such that the dischargeable power of the overall power supply system is relatively difficult to be limited in comparison with an electronic control unit according to a comparative embodiment in which the power supply system is controlled without taking the first rates of change into consideration. That is, the electronic control unit is able to control the power supply system such that the dischargeable power of the overall power supply system is suitably ensured.

Specifically, for example, the dischargeable power of each electrical storage device is limited in a case where the current charge state value of each electrical storage device is relatively low. That is, when the current charge state value of each electrical storage device is relatively low, the dischargeable power of each electrical storage device is gradually limited with a discharge from the corresponding electrical storage device. On the other hand, the dischargeable power of each electrical storage device gradually recovers with a charge into the corresponding electrical storage device. As the first rate of change increases, the dischargeable power is limited at a relatively higher rate with a discharge. Similarly, as the first rate of change increases, the dischargeable power recovers at a relatively higher rate with a charge. That is, the magnitude of the first rate of change influences a mode in which the dischargeable power is limited. Therefore, by taking the magnitude relation between the first rates of change into consideration, the electronic control unit is able to control the power supply system such that the dischargeable power of the overall power supply system is relatively difficult to be limited in comparison with the electronic control unit according to the comparative embodiment in which the power supply system is controlled without taking the first rates of change into consideration.

Similarly, the electronic control unit is able to suitably control the power supply system such that electric power is distributed in consideration of the magnitude relation in the second rate of change (that is, the rate of change in chargeable power) between the plurality of electrical storage devices. Thus, the electronic control unit is able to, while taking the second rates of change into consideration, control the power supply system (cause the distributor to distribute electric power) such that the chargeable power of the overall power supply system is relatively difficult to be limited. The electronic control unit is able to, while taking the second rates of change into consideration, cause the distributor to distribute electric power such that the chargeable power of the overall power supply system is relatively difficult to be limited. That is, the electronic control unit is able to control the power supply system such that the chargeable power of the overall power supply system is relatively difficult to be limited in comparison with the electronic control unit according to a comparative embodiment in which the power supply system is controlled without taking the second rates of change into consideration. That is, the electronic control unit is able to control the power supply system such that the chargeable power of the overall power supply system is suitably ensured.

Specifically, for example, the chargeable power of each electrical storage device is limited when the current charge state value of each electrical storage device is relatively high. That is, when the current charge state value of each electrical storage device is relatively high, the chargeable power of each electrical storage device is gradually limited with a charge into the corresponding electrical storage device. On the other hand, the chargeable power of each electrical storage device gradually recovers with a discharge from the corresponding electrical storage device. As the second rate of change increases, the chargeable power is limited at a relatively higher rate with a charge. Similarly, as the second rate of change increases, the chargeable power recovers at a relatively higher rate with a discharge. That is, the magnitude of the second rate of change influences a mode in which the chargeable power is limited. Therefore, by taking the magnitude relation between the second rates of change into consideration, the electronic control unit is able to control the power supply system such that the chargeable power of the overall power supply system is relatively difficult to be limited in comparison with the electronic control unit according to the comparative embodiment in which the power supply system is controlled without taking the second rates of change into consideration.

In the above aspect, the electronic control unit may be configured to when a current charge state value of each electrical storage device is lower than or equal to a first threshold in a discharge situation that each electrical storage device is discharged, set the distribution mode such that an allocation of electric power that is discharged from one of the plurality of electrical storage devices, which has a relatively low first rate of change, is large, as compared to the allocation of electric power that is discharged from the one of the plurality of electrical storage devices when the current charge state value of each electrical storage device is higher than the first threshold in the discharge situation. The electronic control unit may be configured to when the current charge state value of each electrical storage device is higher than or equal to a second threshold higher than the first threshold in the discharge situation, set the distribution mode such that an allocation of electric power that is discharged from one of the plurality of electrical storage devices, which has a relatively high second rate of change, is large, as compared to the allocation of electric power that is discharged from the one of the plurality of electrical storage devices when the current charge state value of each electrical storage device is lower than the second threshold in the discharge situation.

According to the above aspect, when the current charge state value of each electrical storage device is lower than or equal to the first threshold (that is, the current charge state value of each electrical storage device is relatively low) in the discharge situation, the electronic control unit is able to control the power supply system such that electric power is distributed in consideration of the magnitude relation between the first rates of change (that is, the rates of change in dischargeable power).

Specifically, the electronic control unit is able to control the power supply system such that an allocation of electric power that is discharged from one of the electrical storage devices, having the relatively low first rate of change, in the case where the current charge state value of each electrical storage device is lower than or equal to the first threshold in the discharge situation is larger than the allocation of electric power that is discharged from the one of the electrical storage devices in the case where the current charge state value of each electrical storage device is not lower than or equal to the first threshold in the discharge situation. That is, the electronic control unit is able to control the power supply system such that the allocation of electric power that is discharged from one of the electrical storage devices, having the relatively low rate of change, in the case where the current charge state value of each electrical storage device is lower than or equal to the first threshold in the discharge situation is larger than the allocation of electric power that is discharged from the one of the electrical storage devices in the case where the current charge state value of each electrical storage device is not lower than or equal to the first threshold in the discharge situation.

From the other way around, the electronic control unit is able to control the power supply system such that the allocation of electric power that is discharged from one of the electrical storage devices, having the relatively high first rate of change, in the case where the current charge state value of each electrical storage device is lower than or equal to the first threshold in the discharge situation is smaller than the allocation of electric power that is discharged from the one of the electrical storage devices in the case where the current charge state value of each electrical storage device is not lower than or equal to the first threshold in the discharge situation. That is, the electronic control unit is able to control the power supply system such that the allocation of electric power that is discharged from one of the electrical storage devices, having the relatively high first rate of change, in the case where the current charge state value of each electrical storage device is lower than or equal to the first threshold in the discharge situation is smaller than the allocation of electric power that is discharged from the one of the electrical storage devices in the case where the current charge state value of each electrical storage device is not lower than or equal to the first threshold in the discharge situation.

As described above, as the first rate of change increases, the dischargeable power is limited at a relatively higher rate with a discharge. Therefore, the electronic control unit is able to control the power supply system such that the electrical storage device of which the dischargeable power is limited at a relatively lower rate with a discharge (that is, the electrical storage device having the relatively low first rate of change) is preferentially discharged in the discharge situation. In other words, the electronic control unit is able to control the power supply system such that the electrical storage device of which the dischargeable power is limited at a relatively, higher rate with a discharge (that is, the electrical storage device having the relatively high first rate of change) is difficult to be discharged in the discharge situation. As a result, the electronic control unit is able to control the power supply system such that the dischargeable power of the overall power supply system is relatively difficult to be limited in comparison with the electronic control unit according to the comparative embodiment in which the power supply system is controlled without consideration of the first rate of change.

Similarly, according to this aspect, when the current charge state value of each electrical storage device is higher than or equal to the second threshold (that is, the current charge state value of each electrical storage device is relatively high) in the discharge situation, the electronic control unit is able to suitably control the power supply system such that electric power is distributed in consideration of the magnitude relation between the second rates of change (that is, the rates of change in chargeable power).

Specifically, the electronic control unit is able to control the power supply system such that the allocation of electric power that is discharged from one of the electrical storage devices, having the relatively high second rate of change, in the case where the current charge state value of each electrical storage device is higher than or equal to the second threshold in the discharge situation is larger than the allocation of electric power that is discharged from the one of the electrical storage device in the case where the current charge state value of each electrical storage device is not higher than or equal to the second threshold in the discharge situation. That is, the electronic control unit is able to control the power supply system such that the allocation of electric power that is discharged from one of the electrical storage devices, having the relatively high second rate of change, in the case where the current charge state value of each electrical storage device is higher than or equal to the second threshold in the discharge situation is larger than the allocation of electric power that is discharged from the one of the electrical storage devices in the case where the current charge state value of each electrical storage device is not higher than or equal to the second threshold in the discharge situation.

From the other way around, the electronic control unit is able to control the power supply system such that the allocation of electric power that is discharged from one of the electrical storage devices, having the relatively low second rate of change, in the case where the current charge state value of each electrical storage device is higher than or equal to the second threshold in the discharge situation is smaller than the allocation of electric power that is discharged from the one of the electrical storage devices in the case where the current charge state value of each electrical storage device is not higher than or equal to the second threshold in the discharge situation. That is, the electronic control unit is able to control, the power supply system such that the allocation of electric power that is discharged from one of the electrical storage devices, having the relatively low second rate of change, in the case where the current charge state value of each electrical storage device is higher than or equal to the second threshold in the discharge situation is smaller than the allocation of electric power that is discharged from the one of the electrical storage devices in the case where the current charge state value of each electrical storage device is not higher than or equal to the second threshold in the discharge situation.

As described above, as the second rate of change increases, the chargeable power recovers at a relatively higher rate with a discharge. Therefore, the electronic control unit is able to control the power supply system such that the electrical storage device of which the chargeable power recovers at a relatively higher rate with a discharge (that is, the electrical storage device having the relatively high second rate of change) is preferentially discharged in the discharge situation. In other words, the electronic control unit is able to control the power supply system such that the electrical storage device of which the chargeable power recovers at a relatively lower rate with a discharge (that is, the electrical storage device having the relatively low second rate of change) is difficult to be discharged in the discharge situation. As a result, the electronic control unit is able to control the power supply system such that the chargeable power of the overall power supply system is relatively difficult to be limited in comparison with the electronic control unit according to the comparative embodiment in which the power supply system is controlled without consideration of the second rate of change.

In the above aspect, the electronic control unit may be configured to when a current charge state value of each electrical storage device is lower than or equal to a first threshold in a charge situation that each electrical storage device is being charged, set the distribution mode such that an allocation of electric power that is charged into one of the plurality of electrical storage devices, which has a relatively high first rate of change, is large, as compared to the allocation of electric power that is charged into the one of the plurality of electrical storage devices when the current charge state value of each electrical storage device is higher than the first threshold in the charge situation. The electronic control unit may be configured to when the current charge state value of each electrical storage device is higher than or equal to a second threshold higher than the first threshold in the charge situation, set the distribution mode such that an allocation of electric power that is charged into one of the plurality of electrical storage devices, which has a relatively low second rate of change, is large, as compared to the allocation of electric power that is charged into the one of the plurality of electrical storage devices when the current charge state value of each electrical storage device is lower than the second threshold in the charge situation.

According to the above aspect, when the current charge state value of each electrical storage device is lower than or equal to the first threshold (that is, the current charge state value of each electrical storage device is relatively low) in the charge situation, the electronic control unit is able to control the power supply system such that electric power is distributed in consideration of the magnitude relation between the first rates of change (that is, the rates of change in dischargeable power).

Specifically, the electronic control unit is able to control the power supply system such that an allocation of electric power that is charged into one of the electrical storage devices, having the relatively high first rate of change, in the case where the current charge state value of each electrical storage device is lower than or equal to the first threshold in the charge situation is larger than the allocation of electric power that is charged into the one of the electrical storage devices in the case where the current charge state value of each electrical storage device is not lower than or equal to the first threshold in the charge situation. That is, the electronic control unit is able to control the power supply system such that the allocation of electric power that is charged into one of the electrical storage devices, having the relatively high first rate of change, in the case where the current charge state value of each electrical storage device is lower than or equal to the first threshold in the charge situation is larger than the allocation of electric power that is charged into the one of the electrical storage devices in the case where the current charge state value of each electrical storage device is not lower than or equal to the first threshold in the charge situation. From the other way around, the electronic control unit is able to control the power supply system such that the allocation of electric power that is charged into one of the electrical storage devices, having the relatively low first rate of change, in the case where the current charge state value of each electrical storage device is lower than or equal to the first threshold in the charge situation is smaller than the allocation of electric power that is charged into the one of the electrical storage devices in the case where the current charge state value of each electrical storage device is not lower than or equal to the first threshold in the charge situation. That is, the electronic control unit is able to control the power supply system such that the allocation of electric power that is charged into one of the electrical storage devices, having the relatively low first rate of change, in the case where the current charge state value of each electrical storage device is lower than or equal to the first threshold in the charge situation is smaller than the allocation of electric power that is charged into the one of the electrical storage devices having in the case where the current charge state value of each electrical storage device is not lower than or equal to the first threshold in the charge situation.

As described above, as the first rate of change increases, the dischargeable power recovers at a relatively higher rate with a charge. Therefore, the electronic control unit is able to control the power supply system such that the electrical storage device of which the dischargeable power recovers at a relatively higher rate with a charge (that is, the electrical storage device having the relatively high first rate of change) is preferentially charged in the charge situation. In other words, the electronic control unit is able to control the power supply system such that the electrical storage device of which the dischargeable power recovers at a relatively lower rate with a charge (that is, the electrical storage device having the relatively low first rate of change) is difficult to be charged in the charge situation. As a result, the electronic control unit is able to control the power supply system such that the dischargeable power of the overall power supply system is relatively difficult to be limited in comparison with the electronic control unit according to the comparative embodiment in which the power supply system is controlled without consideration of the first rate of change.

Similarly, according to this aspect, when the current charge state value of each electrical storage device is higher than or equal to the second threshold (that is, the current charge state value of each electrical storage device is relatively high) in the charge situation, the electronic control unit is able to suitably control the power supply system such that electric power is distributed in consideration of the magnitude relation between the second rates of change (that is, the rates of change in chargeable power).

Specifically, the electronic control unit is able to control the power supply system such that the allocation of electric power that is charged into one of the electrical storage devices, having the relatively low second rate of change, in the case where the current charge state value of each electrical storage device is higher than or equal to the second threshold in the charge situation is larger than the allocation of electric power that is charged into the one of the electrical storage devices in the case where the current charge state value of each electrical storage device is not higher than or equal to the second threshold in the charge situation. That is, the electronic control unit is able to control the power supply system such that the allocation of electric power that is charged into one of the electrical storage devices, having the relatively low second rate of change, in the case where the current charge state value of each electrical storage device is higher than or equal to the second threshold in the charge situation is larger than the allocation of electric power that is charged into the one of the electrical storage devices in the case where the current charge state value of each electrical storage device is not higher than or equal to the second threshold in the charge situation.

From the other way around, the electronic control unit is able to control the power supply system such that the allocation of electric power that is charged into one of the electrical storage devices, having the relatively high second rate of change, in the case where the current charge state value of each electrical storage device is higher than or equal to the second threshold in the charge situation is smaller than the allocation of electric power that is charged into the one of the electrical storage devices in the case where the current charge state value of each electrical storage device is not higher than or equal to the second threshold in the charge situation. That is, the electronic control unit is able to control the power supply system such that the allocation of electric power that is charged into one of the electrical storage devices, having the relatively high second rate of change, in the case where the current charge state value of each electrical storage device is higher than or equal to the second threshold in the charge situation is smaller than the allocation of electric power that is charged into the one of the electrical storage devices in the case where the current charge state value of each electrical storage device is not higher than or equal to the second threshold in the charge situation.

As described above, as the second rate of change increases, the chargeable power is limited at a relatively higher rate with a charge. Therefore, the electronic control unit is able to control the power supply system such that the electrical storage device of which the chargeable power is limited at a relatively lower rate with a charge (that is, the electrical storage device having the relatively low second rate of change) is preferentially charged in the charge situation. In other words, the electronic control unit is able to control the power supply system such that the electrical storage device of which the chargeable power is limited at a relatively higher rate with a charge (that is, the electrical storage device having the relatively high second rate of change) is difficult to be charged in the charge situation. As a result, the electronic control unit is able to control the power supply system such that the chargeable power of the overall power supply system is relatively difficult to be limited in comparison with the electronic control unit according to the comparative embodiment in which the power supply system is controlled without consideration of the second rate of change.

In the above aspect, the electronic control unit may be configured to set the distribution mode such that the plurality of electrical storage devices are charged or discharged in descending order of the first rate of change, or are charged or discharged in ascending order of the first rate of change. The electronic control unit may be configured to set the distribution mode such that the plurality of electrical storages device are charged or discharged in descending order of the second rate of change, or are charged or discharged in ascending order of the second rate of change.

According to the above aspect, the electronic control unit is able to suitably control the power supply system such that electric power is distributed in consideration of the magnitude relation between the first rates of change (that is, the rates of change in dischargeable power). Thus, the electronic control unit is able to, while taking the magnitude between the first rates of change into consideration, suitably control the power supply system such that the dischargeable power of the overall power supply system is suitably ensured.

Similarly, the electronic control unit is able to suitably control the power supply system such that electric power is distributed in consideration of the magnitude relation between the second rates of change (that is, the rates of change in chargeable power). Thus, the electronic control unit is able to, while taking the magnitude between the second rates of change into consideration, suitably control the power supply system such that the chargeable power of the overall power supply system is suitably ensured.

In the above aspect, the electronic control unit may be configured to set the distribution mode such that the plurality of electrical storage devices are discharged in ascending order of the first rate of change, when a current charge state value of each electrical storage device is lower than or equal to a first threshold in a discharge situation that each electrical storage device is being discharged. The electronic control unit may be configured to set the distribution mode such that the plurality of electrical storage devices are discharged in descending order of the second rate of change, when the current charge state value of each electrical storage device is higher than or equal to a second threshold higher than the first threshold in the discharge situation.

According to the above aspect, when the current charge state value of each electrical storage device is lower than or equal to the first threshold in the discharge situation, the electronic control unit is able to control the power supply system such that the plurality of electrical storage devices are discharged in ascending order of the first rate of change. For example, the electronic control unit is able to control the power supply system such that the following discharge operation is repeated. That is, a discharge from the ath electrical storage device having the ath lowest first rate of change (where a is an integer larger than or equal to 1) completes, and then a discharge from the (a+1)th electrical storage device having the (a+1)th lowest first rate of change is started. Therefore, the electronic control unit is able to control the power supply system such that the dischargeable power of the overall power supply system is relatively difficult to be limited in comparison with the electronic control unit according to the comparative embodiment in which the power supply system is controlled without consideration of the first rate of change.

Similarly, when the current charge state value of each electrical storage device is higher than or equal to the second threshold in the discharge situation, the electronic control unit is able to control the power supply system such that the plurality of electrical storage devices are discharged in descending order of the second rate of change. For example, the electronic control unit is able to control the power supply system such that the following discharge operation is repeated. That is, a discharge from the bth electrical storage device having the bth highest second rate of change (where b is an integer larger than or equal to 1) completes, and then a discharge from the (b+1)th electrical storage device having the (b+1)th highest second rate of change is started. Therefore, the electronic control unit is able to control the power supply system such that the chargeable power of the overall power supply system is relatively difficult to be limited in comparison with the electronic control unit according to the comparative embodiment in which the power supply system is controlled without consideration of the second rate of change.

In the above aspect, the electronic control unit may be configured to set the distribution mode such that the plurality of electrical storage devices are charged in descending order of the first rate of change, when a current charge state value of each electrical storage device is lower than or equal to a first threshold in a charge situation that each electrical storage device is being charged. The electronic control unit may be configured to set the distribution mode such that the plurality of electrical storage devices are charged in ascending order of the second rate of change, when the current charge state value of each, electrical storage device is higher than or equal to a second threshold higher than the first threshold in the charge situation.

According to the above aspect, when the current charge state value of each electrical storage device is lower than or equal to the first threshold in the charge situation, the electronic control unit is able to control the power supply system such that the plurality of electrical storage devices are charged in descending order of the first rate of change. For example, the electronic control unit is able to control the power supply system such that the following charge operation is repeated. That is, a charge into the cth electrical storage device having the cth highest first rate of change (where c is an integer larger than or equal to 1) completes, and then a charge into the (c+1)th electrical storage device having the (c+1)th highest first rate of change is started. Therefore, the electronic control unit is able to control the power supply system such that the dischargeable power of the overall power supply system is relatively difficult to be limited in comparison with the electronic control unit according to the comparative embodiment in which the power supply system is controlled without consideration of the first rate of change.

Similarly, when the current charge state value of each electrical storage device is higher than or equal to the second threshold in the charge situation, the electronic control unit is able to control the power supply system such that the plurality of electrical storage devices are charged in ascending order of the second rate of change. For example, the electronic control unit is able to control the power supply system such that the following charge operation is repeated. That is, a charge into the dth electrical storage device having the dth lowest second rate of change (where d is an integer larger than or equal to 1) completes, and then a charge into the (d+1)th electrical storage device having the (d+1)th lowest second rate of change is started. Therefore, the electronic control unit is able to control the power supply system such that the chargeable power of the overall power supply system is relatively difficult to be limited in comparison with the electronic control unit according to the comparative embodiment in which the power supply system is controlled without consideration of the second rate of change.

When the current charge state value of each electrical storage device is higher than the first threshold and is lower than the second threshold (where the second threshold is higher than the first threshold), the electronic control unit may set the distribution mode such that the charge state values of the plurality of electrical storage devices respectively reach corresponding target values at the same time. In this case, the electronic control unit may set the distribution mode such that electric power is distributed at the ratio of available discharge energies of the plurality of electrical storage devices (where each available discharge energy is a difference between the current charge state value of the corresponding electrical storage device and the charge state value of the corresponding electrical storage device at the timing at which the dischargeable power of the corresponding electrical storage device begins to be limited) in the discharge situation in which each electrical storage device is being discharged. The electronic control unit may set the distribution mode such that electric power is distributed at the ratio of available charge energies of the plurality of electrical storage devices (where each available charge energy is a difference between the current charge state value of the corresponding electrical storage device and the charge state value of the corresponding electrical storage device at the timing at which the chargeable power of the corresponding electrical storage device begins to be limited) in the charge situation in which each electrical storage device is being charged.

Such operations and other advantages of the invention are further become apparent from embodiments that will be described below.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a flowchart that shows the general flow of operations of controlling a vehicle (substantially, operations of controlling a power supply system, and operations of distributing electric power between a first power supply and a second power supply) according to the embodiment;

DETAILED DESCRIPTION OF EMBODIMENTS

Hereinafter, an embodiment of a case where the power supply system according to the invention is applied to a vehicle 1 including a motor generator 10 will be described as an example of a mode for carrying out the invention with reference to the accompanying drawings. The power supply system according to the invention may be applied to not only the vehicle 1 including the motor generator 10 but also any device that utilizes electric power that is supplied from the power supply system.

Figure 1:
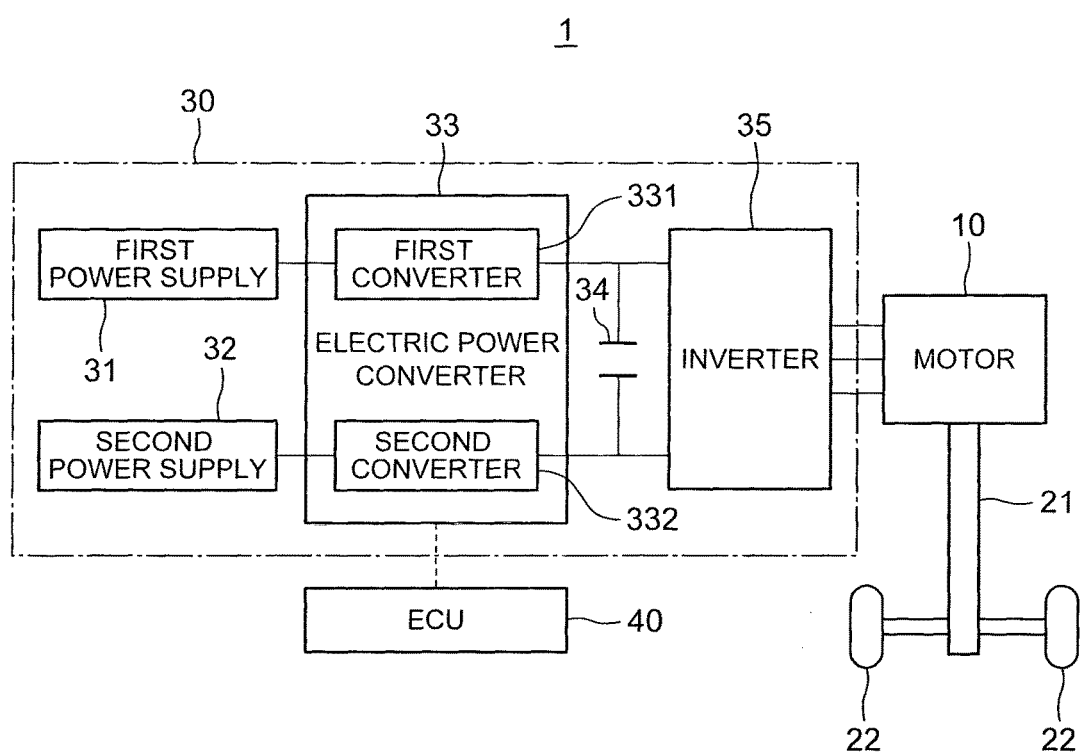
FIG. 1 is a block diagram that shows an example of the configuration of a vehicle according to an embodiment.

The configuration of the vehicle 1 according to the present embodiment will be described with reference to FIG. 1. FIG. 1 is a block diagram that shows an example of the configuration of the vehicle 1 according to the present embodiment.

As shown in FIG. 1, the vehicle 1 includes the motor generator 10, an axle 21, wheels 22, a power supply system 30, and an electronic control unit (ECU) 40. The ECU 40 is one specific example of a "power supply control apparatus (that is, including setting means and control means)".

During powering, the motor generator 10 mainly functions as an electric motor that supplies power (that is, power that is required to propel the vehicle 1) to the axle 21 by being driven with electric power that is output from the power supply system 30. During regeneration, the motor generator 10 mainly functions as a generator for charging a first power supply 31 and a second power supply 32 that are provided in the power supply system 30.

The axle 21 is a transmission shaft for transmitting power to the wheels 22. The power is output from the motor generator 10.

The wheels 22 transmit power to a road surface. The power is transmitted via the axle 21. FIG. 1 shows an example in which the vehicle 1 includes the wheels 22 one by one at each of the right and left sides. Actually, the vehicle 1 preferably includes the wheels 22 one by one at each of the front and rear right and left sides (that is, the four wheel 22 in total).

FIG. 1 illustrates the vehicle 1 including the single motor generator 10. The vehicle 1 may include two or more motor generators 10. In addition, the vehicle 1 may further include an engine in addition to the motor generator 10. That is, the vehicle 1 according to the present embodiment may be an electric vehicle or a hybrid vehicle.

During powering, the power supply system 30 outputs, to the motor generator 10, electric power that is required for the motor generator 10 to function as an electric motor. During regeneration, electric power that is generated by the motor generator 10 that functions as a generator is input to the power supply system 30 from the motor generator 10.

The power supply system 30 includes the first power supply 31, the second power supply 32, an electric power converter 33, a smoothing capacitor 34 and an inverter 35. The first power supply 31 is one specific example of "electrical storage means (electrical storage device)". The second power supply 32 is one specific example of the "electrical storage means (electrical storage device)". The electric power converter 33 is one specific example of "distribution means (distributor)".

Each of the first power supply 31 and the second power supply 32 is a power supply that is able to receive electric power (that is, to be charged) or output electric power (that is, to be discharged). At least one of the first power supply 31 or the second power supply 32 may be a storage battery that is able to be charged or discharged by utilizing, for example, an electrochemical reaction (that is, a reaction to convert chemical energy to electric energy). Examples of such a storage battery, for example, include a lead acid battery, a lithium ion battery, a nickel-metal hydride battery, a fuel cell, and the like. Alternatively, at least one of the first power supply 31 or the second power supply 32 may be a capacitor that is able to be charged or discharged by utilizing a physical action or chemical action to accumulate electric charge (that is, electric energy). Examples of such a capacitor, for example, include an electric double layer capacitor, and the like.

Each of Wout indicating an allowable value of electric power that is dischargeable from the first power supply 31 and Win indicating an allowable value of electric power that is chargeable into the first power supply 31 can fluctuate depending on the state of charge (SOC) of the first power supply 31. Similarly, each of Wout indicating an allowable value of electric power that is dischargeable from the second power supply 32 and Win indicating an allowable value of electric power that is chargeable into the second power supply 32 can also fluctuate depending on the SOC of the second power supply 32.

Hereinafter, for the sake of convenience of description, Wout of the first power supply. 31 is referred to as "Wout1". Win of the first power supply 31 is referred to as "Win1". The SOC of the first power supply 31 is referred to as "SOC1". Wout of the second power supply 32 is referred to as "Wout2". Win of the second power supply 32 is referred to as "Win2". The SOC of the second power supply 32 is referred to as "SOC2". In this case, each of Wout1 and Wout2 is one specific example of "dischargeable power". Each of Win1 and Win2 is one specific example of "chargeable power". The "SOC" is one specific example of "charge state value".

Figure 2A:
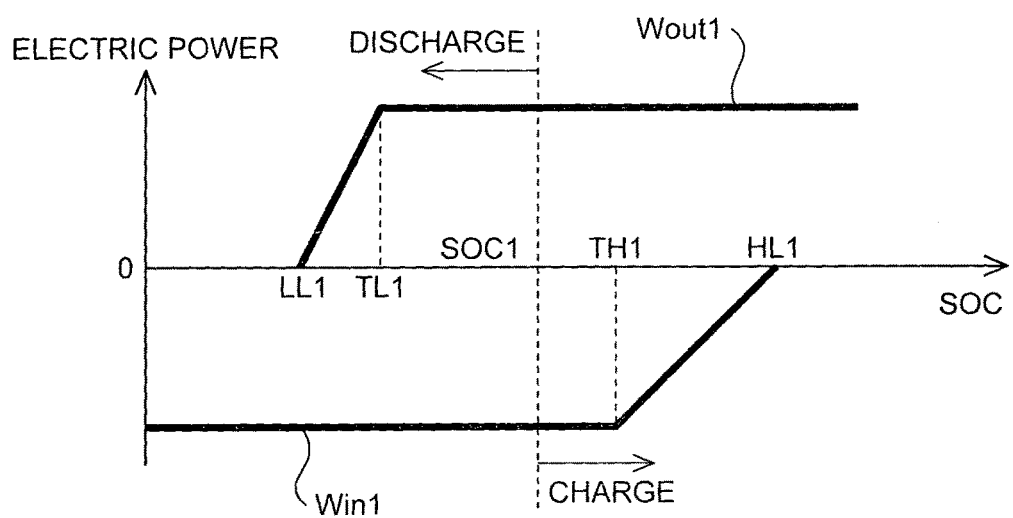
FIG. 2A is a graph that shows the correlation between both Wout1 and Win1 and SOC1.
Figure 2B:
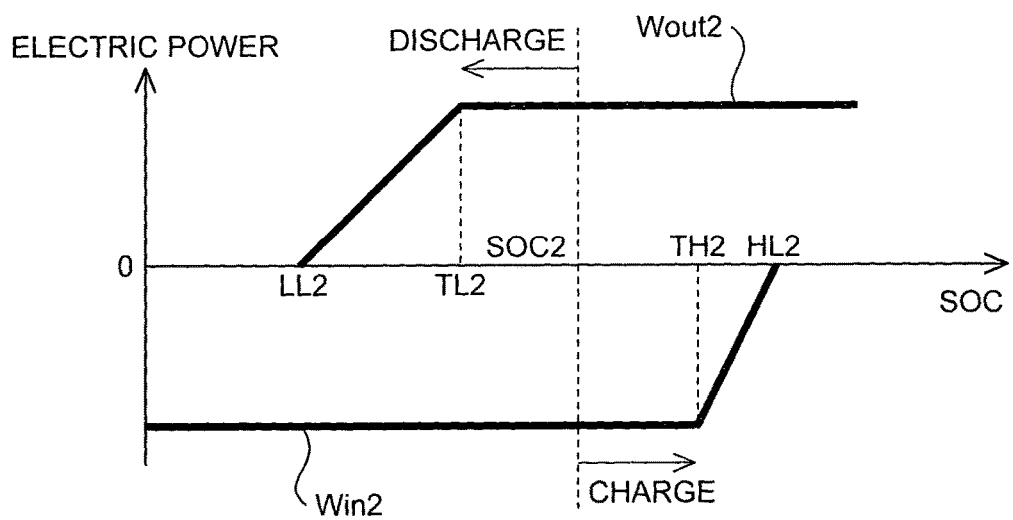
FIG. 2B is a graph that shows the correlation between both Wout2 and Win2 and SOC2.

The correlation between both Wout1 and Win1 and SOC1 will be described with reference to FIG. 2A. The correlation between both Wout2 and Win2 and SOC2 will be described with reference to FIG. 2B. FIG. 2A is a graph that shows the correlation between both Wout1 and Win1 and SOC1. FIG. 2B is a graph that shows the correlation between both Wout2 and Win2 and SOC2.

Hereinafter, in description of Wout1 and Win1, for the sake of convenience, an electric power that is discharged from the first power supply 31 is defined as a positive electric power. An electric power that is charged into the first power supply 31 is defined as a negative electric power. Thus, typically, Wout1 is provided by a positive value. On the other hand, Win1 is provided by a negative value. This also applies to Wout2 and Win2.

As shown in FIG. 2A, Wout1 is limited when SOC1 becomes lower than a lower limit value TL1. Specifically, in a region in which SOC1 is lower than the lower limit value TL1, Wout1 is more limited (decreases in the example shown in FIG. 2A) as SOC1 decreases. Wout1 becomes zero when SOC1 becomes lower than a minimum lower limit value LL1. That is, the minimum lower limit value LL1 indicates a discharge limit of the first power supply 31.

Win1 is limited when SOC1 becomes higher than an upper limit value TH1. Specifically, in a region in which SOC1 is higher than the upper limit value TH1, Win1 is more limited (increases in the example shown in FIG. 2A) as SOC1 increases. Win1 becomes zero when SOC1 becomes higher than a maximum upper limit value HL1. That is, the maximum upper limit value HL1 indicates a charge limit of the first power supply 31.

As shown in FIG. 2B, Wout2 and Win2 change in modes similar to those of Wout1 and Win1. However, for the second power supply 32, the minimum lower limit value LL1, lower limit value TL1, upper limit value TH1 and maximum upper limit value HL1 of the first power supply 31 are respectively replaced with a minimum lower limit value LL2, a lower limit value TL2, an upper limit value TH2 and a maximum upper limit value HL2. In the present embodiment, it is assumed that the minimum lower limit value LL1 is the same as the minimum lower limit value LL2 and the maximum upper limit value HL1 is the same as the maximum upper limit value HL2. In addition, in the present embodiment, it is assumed that the lower limit value TL1 is lower than the lower limit value TL2 and the upper limit value TH1 is lower than the upper limit value TH2. However, the minimum lower limit value LL1 may be lower than the minimum lower limit value LL2 or may be higher than the minimum lower limit value LL2. The maximum upper limit value HL1 may be lower than the maximum upper limit value HL2 or may be higher than the maximum upper limit value HL2. The lower limit value. TL1 may be higher than the lower limit value TL2 or may be the same as the lower limit value TL2. The upper limit value TH1 may be higher than the upper limit value TH2 or may be the same as the upper limit value TH2.

Each of the lower limit value TL1 and the lower limit value TL2 is one specific example of "first threshold". The upper limit value TH1 is one specific example of "second threshold".

Referring back to FIG. 1, the electric power converter 33, under control of the ECU 40, converts electric power that is output from the first power supply 31 and electric power that is output from the second power supply 32 on the basis of required electric power that is required by the power supply system 30. The required electric power that is required by the power supply system 30 is typically, an electric power that should be output from the power supply system 30 to the motor generator 10. The electric power converter 33 outputs the converted electric powers to the inverter 35. In addition, the electric power converter 33, under control of the ECU 40, converts electric power that is input from the inverter 35 on the basis of required electric power that is required by the power supply system 30. The electric power that is input from the inverter 35 is, in other words, electric power generated as a result of regeneration of the motor generator 10. The required electric power that is required by the power supply system 30 is, typically, electric power that should be input to the power supply system 30, and is substantially electric power that should be input to the first power supply 31 and the second power supply 32. The electric power converter 33 outputs the converted electric power to at least one of the first power supply 31 or the second power supply 32. As a result of such electric power conversion, the electric power converter 33 is substantially able to distribute electric power between both the first power supply 31 and the second power supply 32 and the inverter 35 and distribute electric power between the first power supply 31 and the second power supply 32.

In order to carry out such conversion of electric power, the electric power converter 33 includes a first converter 331 and a second converter 332. The first converter 331 converts electric power (converts voltage) between the first power supply 31 and the inverter 35. The second converter 332 converts electric power (converts voltage) between the second power supply 32 and the inverter 35. Each of the first converter 331 and the second converter 332 converts electric power under control of the ECU 40.

During powering, the smoothing capacitor 34 smoothes electric power that is supplied from the electric power converter 33 to the inverter 35. Fluctuations in electric power that is supplied from the electric power converter 33 to the inverter 35 are substantially fluctuations in voltage in a power supply line between the electric power converter 33 and the inverter 35. Similarly, during regeneration, the smoothing capacitor 34 smoothes fluctuations in electric power that is supplied from the inverter 35 to the electric power converter 33. Fluctuations in electric power that is supplied from the inverter 35 to the electric power converter 33 are substantially fluctuations in voltage in the power supply line between the electric power converter 33 and the inverter 35.

During powering, the inverter 35 converts electric power (direct-current power), which is output from the electric power converter 33, to alternating-current power. After that, the inverter 35 supplies electric power, converted to alternating-current power, to the motor generator 10. In addition, during regeneration, the inverter 35 converts electric power (alternating-current power), generated by the motor generator 10, to direct-current power. After that, the inverter 35 supplies electric power, converted to direct-current power, to the electric power converter 33.

The ECU 40 is an electronic control unit configured to be able to control the overall operation of the vehicle 1. The ECU 40 includes a central processing unit (CPU), a read only memory (ROM), a random access memory (RAM), and the like.

Particularly, the ECU 40 controls a distribution of electric power in the above-described electric power converter 33. More specifically, when the power supply system 30 is outputting electric power to the motor generator 10, the ECU 40 sets a discharge distribution ratio. The discharge distribution ratio indicates a distribution between electric power that is discharged from the first power supply 31 and electric power that is discharged from the second power supply 32. The fact that the power supply system 30 is outputting electric power to the motor generator 10 is, in other words, the fact that the power supply system 30 is being discharged. After that, the ECU 40 controls the electric power converter 33 such that electric power is distributed at the set discharge distribution ratio. In addition, when the motor generator 10 is outputting electric power to the power supply system 30, the ECU 40 sets a charge distribution ratio. The charge distribution ratio indicates a distribution between electric power that is charged into the first power supply 31 and electric power that is charged into the second power supply 32. The fact that the motor generator 10 is outputting electric power to the power supply system 30 is, in other words, the fact that the power supply system 30 is being charged. After that, the ECU 40 controls the electric power converter 33 such that electric power is distributed at the set charge distribution ratio.

Hereinafter, the operations of distributing electric power between the first power supply 31 and the second power supply 32 under control of the ECU 40 will be described in detail.

In the above description, the power supply system 30 includes the two power supplies (that is, the first power supply 31 and the second power supply 32). However, the power supply system 30 may include three or more power supplies.

The operations of controlling the vehicle 1 according to the present embodiment will be described with reference to FIG. 3 to FIG. 8. The operations of controlling the vehicle 1 according to the present embodiment are substantially the operations of controlling the power supply system 30, and mean the operations of distributing electric power between the first power supply 31 and the second power supply 32.

Initially, the general flow of the operations of controlling the vehicle 1, according to the present embodiment will be described with reference to FIG. 3. FIG. 3 is a flowchart that shows the general flow of the operations of controlling the vehicle 1 according to the present embodiment.

As shown in FIG. 3, the ECU 40 determines whether current SOC1 is higher than or equal to the upper limit value TH1 and current SOC2 is higher than or equal to the upper limit value TH2 (step S01). That is, the ECU 40 determines whether Win1 is limited and Win2 is limited. In addition, the ECU 40 determines whether current SOC1 is lower than or equal to the lower limit value TL1 and current SOC2 is lower than or equal to the lower limit value TL2 (step S02). That is, the ECU 40 determines whether Wout1 is limited and Wout2 is limited.

In order to carry out determinations of step S01 and step S02, the ECU 40 may acquire a current input to or output from the first power supply 31 and a voltage of the first power supply 31, and may calculate SOC1 on the basis of the acquired current and the acquired voltage. Similarly, the ECU 40 may acquire a current that is input to or output from the second power supply 32 and a voltage of the second power supply 32, and may calculate SOC2 on the basis of the acquired current and the acquired voltage.

As a result of the determinations of step S01 and step S02, when it is determined that current SOC1 is not higher than or equal to the upper limit value TH1 or current SOC2 is not higher than or equal to the upper limit value TH2 and it is determined that current SOC1 is not lower than or equal to the lower limit value TL1 or current SOC2 is not lower than or equal to the lower limit value TL2 (No in step S01 and No in step S02), it is estimated that none of Wout1, Wout2, Win1 and Win2 is limited. In this case, the ECU 40 executes first control operations that are executed when none of Wout1, Wout2, Win1 and Win2 is limited. Thus, the ECU 40 executes the operations of distributing electric power between the first power supply 31 and the second power supply 32 (step S1). The first control operations will be described in detail later with reference to FIG. 4.

On the other hand, as a result of the determinations of step S01 and step S02, when it is determined that current SOC1 is lower than or equal to the lower limit value TL1 and current SOC2 is lower than or equal to the lower limit value TL2 (No in step S01 and Yes in step S02), the ECU 40 subsequently determines whether the vehicle 1 is being powered (step S03). For example, when a vehicle required output that is required of the vehicle 1 is a positive value, the ECU 40 may determine that the vehicle 1 is being powered. On the other hand, when the vehicle required output that is required of the vehicle 1 is not a positive value, the ECU 40 may determine that the vehicle 1 is not being powered (that is, the vehicle 1 is regenerating electric power).

As a result of the determination of step S03, when it is determined that the vehicle 1 is being powered (Yes in step S03), it is estimated that the vehicle 1 is being powered in a situation that Wout1 and Wout2 are limited. That is, it is estimated that the power supply system 30 is outputting electric power to the motor generator 10 in a situation that Wout1, and Wout2 are limited (that is, the first power supply 31 and the second power supply 32 are being discharged). In this case, the ECU 40 executes the operations of distributing electric power between the first power supply 31 and the second power supply 32 by executing second control operations that are executed when the vehicle 1 is being powered in a situation that Wout1 and Wout2 are limited (step S2). The second control operations will be described in detail later with reference to FIG. 5.

On the other hand, as a result of the determination of step S03, when it is determined that the vehicle 1 is not being powered (No in step S03), it is estimated that the vehicle 1 is regenerating electric power in a situation that Wout1 and Wout2 are limited. That is, it is estimated that the motor generator 10 is outputting electric power to the power supply system 30 (that is, the first power supply 31 and the second power supply 32 are being charged) in a situation that Wout1 and Wout2 are limited. In this case, the ECU 40 executes the operations of distributing electric power between the first power supply 31 and the second power supply 32 by executing third control operations that are executed when the vehicle 1 is regenerating electric power in a situation that Wout1 and Wout2 are limited (step S3). The third control operations will be described in detail later with reference to FIG. 6.

On the other hand, as a result of the determinations of step S01 and step S02, when it is determined that current SOC1 is higher than or equal to the upper limit value TH1 and the current SOC2 is higher than or equal to the upper limit value TH2 (Yes in step S01), the ECU 40 subsequently determines whether the vehicle 1 is being powered (step S04).

As a result of the determination of step S04, when it is determined that the vehicle 1 is being powered (Yes in step S04), it is estimated that the vehicle 1 is being powered in a situation that Win1 and Win2 are limited. That is, it is estimated that the power supply system 30 is outputting electric power to the motor generator 10 (that is, the first power supply 31 and the second power supply 32 are being discharged) in a situation that Win1 and Win2 are limited. In this case, the ECU 40 executes the operations of distributing electric power between the first power supply 31 and the second power supply 32 by executing fourth control operations that are executed when the vehicle 1 is being powered in a situation that Win1 and Win2 are limited (step S4). The fourth control operations will be described in detail later with reference to FIG. 7.

On the other hand, as a result of the determination of step S04, when it is determined that the vehicle 1 is not being powered (No in step S04), it is estimated that the vehicle 1 is regenerating electric power in a situation that Win1 and Win2 are limited. That is, it is estimated that the motor generator 10 is outputting electric power to the power supply system 30 (that is, the first power supply 31 and the second power supply 32 are being charged) in a situation that Win1 and Win2 are limited. In this case, the ECU 40 executes the operations of distributing electric power between the first power supply 31 and the second power supply 32 by executing fifth control operations that are executed when the vehicle 1 is regenerating electric power in a situation that Win1 and Win2 are limited (step S5). The fifth control operations will be described in detail later with reference to FIG. 8.

In the example shown in FIG. 3, the ECU 40 executes all the second control operations to fifth control operations. However, the ECU 40 may execute at least part of the second control operations to the fifth control operations, while may not execute at least the other part of the second control operations to the fifth control operations. When the ECU 40 does not execute at least the other part of the second control operations to the fifth control operations, the ECU 40 may execute the first control operations instead of the at least the other part of the second control operations to the fifth control operations.

Figure 4:
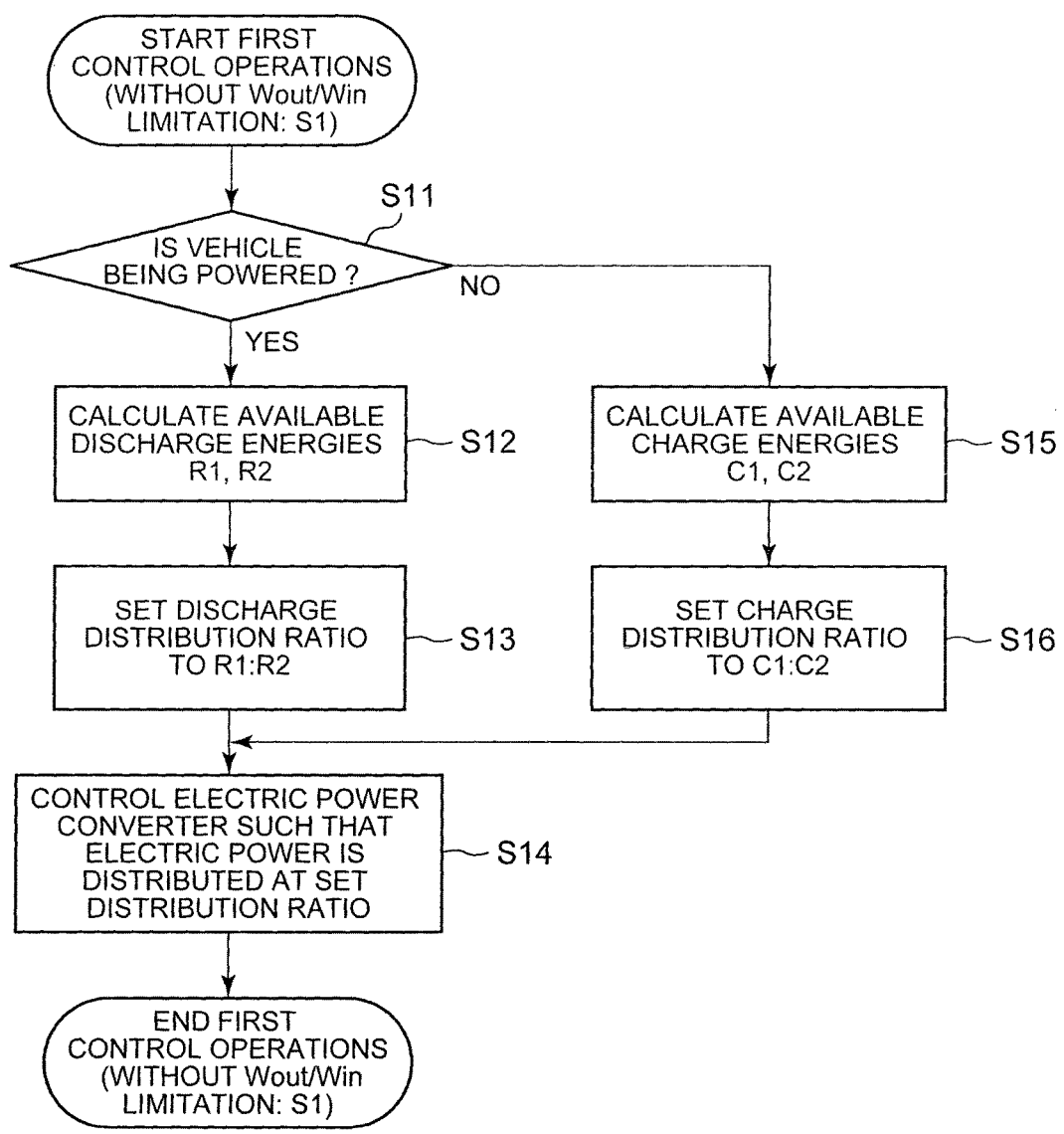
FIG. 4 is a flowchart that shows the flow of first control operations that are executed when none of Wout1, Wout2, Win1 and Win2 is limited.

Subsequently, the flow of the first control operations that are executed, when none of Wout1, Wout2, Win1 and Win2 is limited will be described with reference to FIG. 4. FIG. 4 is a flowchart that shows the flow of the first control operations that are executed when none of Wout1, Wout2, Win1 and Win2 is limited.

As shown in FIG. 4, the ECU 40 determines whether the vehicle 1 is being powered (step S11).

As a result of the determination of step S11, when it is determined that the vehicle 1 is, being powered (Yes in step S11), the ECU 40 calculates an available discharge energy R1 of the first power supply 31 and an available discharge energy R2 of the second power supply 32 (step S12). The available discharge energy R1 corresponds to the amount of electric power that is dischargeable from the first power supply 31 until SOC1 reaches the lower limit value TL1. That is, the available discharge energy R1 is calculated from, the mathematical expression expressed by R1=Storage capacity of the first power supply 31×(Current SOC1−Lower limit value TL1). Similarly, the available discharge energy R2 corresponds to the amount of electric power that is dischargeable from the second power supply 32 until SOC2 reaches the lower limit value TL2. That is, the available discharge energy R2 is calculated from the mathematical expression expressed by R2=Storage capacity of the second power supply 32×(Current SOC2−Lower limit value TL2).

After that, the ECU 40 sets the discharge distribution ratio to R1:R2 (step S13). That is, the ECU 40 sets the discharge distribution ratio such that (electric power that is discharged from the first power supply 31):(electric power that is discharged from the second power supply 32) becomes R1:R2.

After that, the ECU 40 controls the electric power converter 33 such that electric power is distributed at the discharge distribution ratio set in step S13 (step S14). In this case, the first power supply 31 and the second power supply 32 are discharged such that SOC1 and SOC2 respectively reach the lower limit value TL1 and the lower limit value TL2 at the same time.

On the other hand, as a result of the determination of step S11, when it is determined that the vehicle 1 is not being powered (No in step S11), the ECU 40 calculates an available charge energy C1 of the first power supply 31 and an available charge energy C2 of the second power supply 32 (step S15). The available charge energy C1 corresponds to the amount of electric power that is chargeable into the first power supply 31 until SOC1 reaches the upper limit value TH1. That is, the available charge energy C1 is calculated from the mathematical expression expressed by C1=Storage capacity of the first power supply 31×(Upper limit value TH1−Current SOC2). Similarly, the available charge energy C2 corresponds to the amount of electric power that is chargeable from the second power supply 32 until SOC2 reaches the upper limit value TH2. That is, the available charge energy C2 is calculated from the mathematical expression expressed by C2=Storage capacity of the second power supply 32×(Upper limit value TH2−Current SOC2).

After that, the ECU 40 sets the charge distribution ratio to C1:C2 (step S16). That is, the ECU 40 sets the charge distribution ratio such that (electric power that is charged into the first power supply 31):(electric power that is charged into the second power supply 32) becomes C1:C2.

After that, the ECU 40 controls the electric power converter 33 such that electric power is distributed at the charge distribution ratio set in step S16 (step S14). In this case, the first power supply 31 and the second power supply 32 are charged such that SOC1 and SOC2 respectively reach the upper limit value TH1 and the upper limit value TH2 at the same time.

In the above description, in calculating the available discharge energies R1, R2, the lower limit value TL1 and the lower limit value TL2 are respectively used. However, in calculating the available discharge energies R1, R2, a first target value different from the lower limit value TL1 and a second target value different from the lower limit value TL2 may be respectively used. When the available discharge energies R1, R2 are calculated in this way, the first power supply 31 and the second power supply 32 are discharged such that SOC1 and SOC2 respectively reach the first target value and the second target value at the same time.

Similarly, in the above description, in calculating the available charge energies C1, C2, the upper limit value TH1 and the upper limit value TH2 are respectively used. However, in calculating the available charge energies C1, C2, a third target value different from the upper limit value TH1 and a fourth target value different from the upper limit value TH2 may be respectively used. When the available charge energies C1, C2 are calculated in this way, the first power supply 31 and the second power supply 32 are charged such that SOC1 and SOC2 respectively reach the third target value and the fourth target value at the same time.

Figure 5:
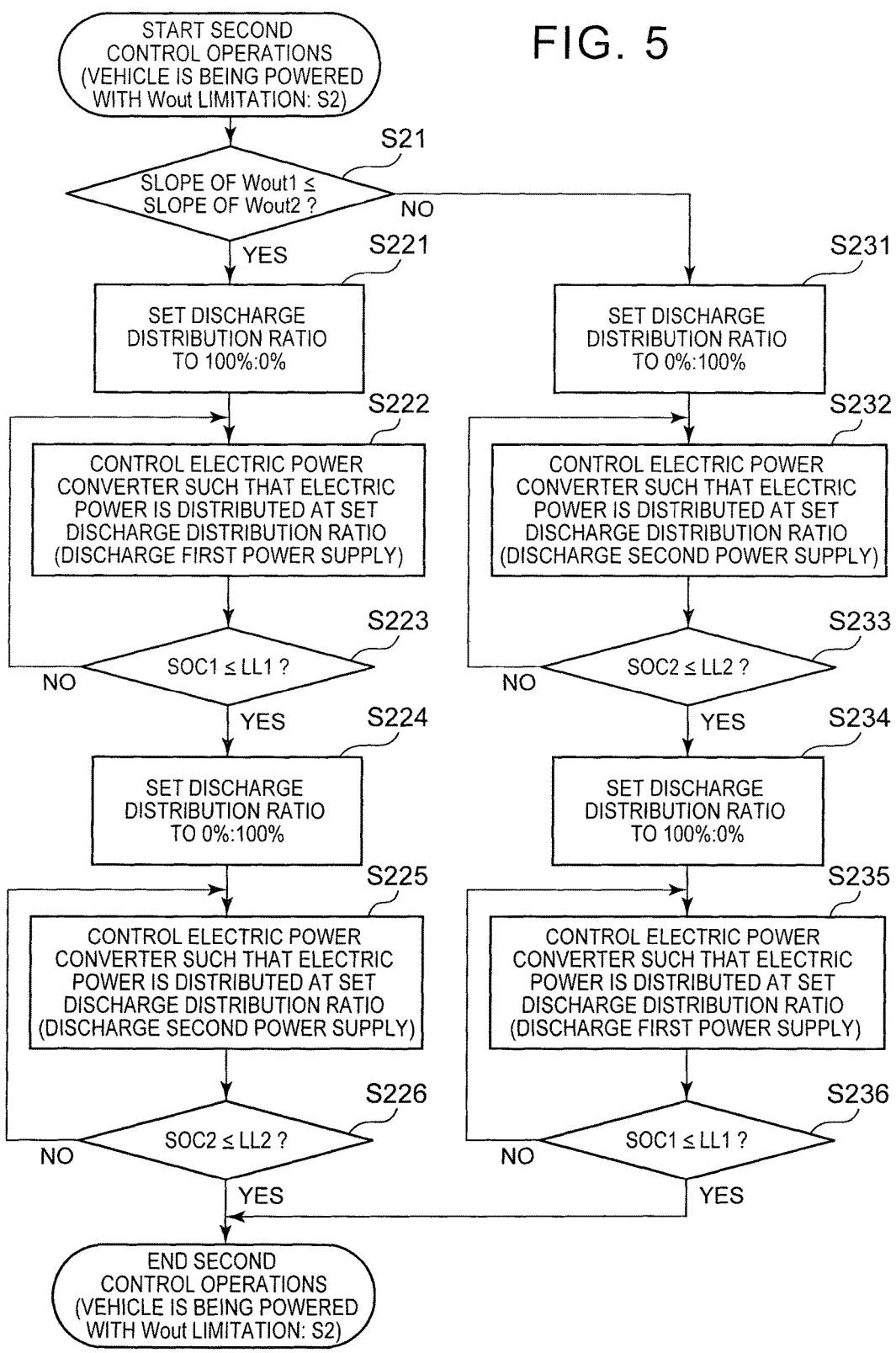
FIG. 5 is a flowchart that shows the flow of second control operations that are executed when the vehicle is carrying out powering (that is, the first power supply and the second power supply are being discharged) in a situation that Wout1 and Wout2 are limited.

Subsequently, the flow of the second control operations that are executed when the vehicle 1 is being powered (that is, the first power supply 31 and the second power supply 32 are being discharged) in a situation that Wout1 and Wout2 are limited will be described with reference to FIG. 5. FIG. 5 is a flowchart that shows the flow of the second control operations that are executed when the vehicle 1 is being powered in a situation that Wout1 and Wout2 are limited.

As shown in FIG. 5, the ECU 40 determines whether the slope of Wout1 is smaller than or equal to the slope of Wout2 (step S21).

The slope of Wout1 means the slope of the graph that represents the correlation between Wout1 and SOC1, shown in FIG. 2A. Thus, the slope of Wout1 means the rate of change in Wout1 to SOC1. That is, the slope of Wout1 means $\Delta Wout1/\Delta SOC1$. In addition, the "slope of Wout1" is the slope of Wout1 in the region in which SOC1 is lower than or equal to the lower limit value TL1. That is, the "slope of Wout1" is the slope of Wout1 in the region in which Wout1 is limited. This also applies to the slope of Wout2.

The correlation between Wout1 and SOC1 is a characteristic unique to each individual power supply. Thus, the ECU 40 preferably stores the correlation between Wout1 and SOC1 (or information that directly or indirectly indicates the slope of Wout1). This also applies to Wout2.

As a result of the determination of step S21, when it is determined that the slope of Wout1 is smaller than or equal to the slope of Wout2 (Yes in step S21), the ECU 40 sets the discharge distribution ratio to 100% (first power supply 31):0% (second power supply 32) (step S221). That is, the ECU 40 sets the discharge distribution ratio such that (electric power that is discharged from the first power supply 31):(electric power that is discharged from the second power supply 32) becomes 100%:0%. In other words, the ECU 40 sets the discharge distribution ratio such that the first power supply 31 having a relatively low (that is, minimum) Wout is discharged and the power supply other than the first power supply 31 (that is, the second power supply 32) is not discharged.

After that, the ECU 40 controls the electric power converter 33 such that electric power is distributed at the discharge distribution ratio set in step S221 (step S222). In this case, the first power supply 31 is discharged, while the second power supply 32 is not discharged. Such a distribution of electric power at the discharge distribution ratio set in step S221 is continued (No in step S223) until SOC1 becomes lower than or equal to the minimum lower limit value LL1.

After SOC1 becomes lower than or equal to the minimum lower limit value LL1 (Yes in step S223), the ECU 40 sets the discharge distribution ratio to 0% (first power supply 31):100% (second power supply 32) (step S224). That is, the ECU 40 sets the discharge distribution ratio such that (electric power that is discharged from the first power supply 31):(electric power that is discharged from the second power supply 32) becomes 0%:100%. In other words, the ECU 40 sets the discharge distribution ratio such that the second power supply 32 having a relatively high (that is, the second lowest) Wout is discharged and the power supply other than the second power supply 32 (that is, the first power supply 31) is not discharged.

After that, the ECU 40 controls the electric power converter 33 such that electric power is distributed at the discharge distribution ratio set in step S224 (step S225). In this case, the first power supply 31 is not discharged, while the second power supply 32 is discharged. Such a distribution of electric power at the discharge distribution ratio set in step S224 is continued (No in step S226), until SOC2 becomes lower than or equal to the minimum lower limit value LL2.

On the other hand, as a result of the determination of step S21, when it is determined that the slope of Wout1 is not smaller than or equal to the slope of Wout2 (No in step S21), the ECU 40 sets the discharge distribution ratio to 0% (first power supply 31):100% (second power supply 32) (step S231). That is, the ECU 40 sets the discharge distribution ratio such that the second power supply 32 having a relatively low (that is, the lowest) Wout is discharged and the other power supply other than the second power supply 32 (that is, the first power supply 31) is not discharged.

After that, the ECU 40 controls the electric power converter 33 such that electric power is distributed at the discharge distribution ratio set in step S231 (step S232). In this case, the first power supply 31 is not discharged, while the second power supply 32 is discharged. Such a distribution of electric power at the discharge distribution ratio set in step S231 is continued (No in step S233) until SOC2 becomes lower than or equal to the minimum lower limit value LL2.

After SOC2 becomes lower than or equal to the minimum lower limit value LL2 (Yes in step S233), the ECU 40 sets the discharge distribution ratio to 100% (first power supply 31):0% (second power supply 32) (step S234). That is, the ECU 40 sets the discharge distribution ratio such that the first power supply 31 having a relatively high (that is, the second lowest) Wout is discharged and the power supply other than the first power supply 31 (that is, the second power supply 32) is not discharged.

After that, the ECU 40 controls the electric power converter 33 such that electric power is distributed at the discharge distribution ratio set in step S234 (step S235). In this case, the first power supply 31 is discharged, while the second power supply 32 is not discharged. Such a distribution of electric power at the discharge distribution ratio set in step S234 is continued (No in step S236) until SOC1 becomes lower than or equal to the minimum lower limit value LL1.

In the above-described second control operations, when the slope of Wout1 is smaller than or equal to the slope of Wout2, the electric power converter 33 is controlled such that the first power supply 31 is discharged and then the second power supply 32 is discharged. On the other hand, when the slope of Wout1 is not smaller than or equal to the slope of Wout2, the electric power converter 33 is controlled such that the second power supply 32 is discharged and then the first power supply 31 is discharged. Therefore, the second control operations are considered as operations of controlling the electric power converter 33 such that the first power supply 31 and the second power supply 32 are discharged in ascending order of the slope of Wout. That is, in the present embodiment, when the first power supply 31 and the second, power supply 32 are discharged in a situation that Wout1 and Wout2 are limited, the electric power converter 33 is controlled such that the power supplies are discharged in ascending order of the slope of Wout.

However, the electric power converter 33 is controlled such that the power supplies are discharged in ascending order of the slope of Wout in the case where Wout is defined as a positive value. That is, the electric power converter 33 is controlled such that the power supplies are discharged in ascending order of the slope of Wout in the case where electric power that is discharged from each power supply is defined as positive electric power and electric power that is charged into each power supply is defined as negative electric power. If Wout is defined as a negative value, the second control operations are preferably operations of controlling the electric power converter 33 such that the power supplies are discharged in descending order of the slope of Wout. That is, when electric power that is discharged from each power supply is defined as negative electric power and electric power that is charged into each power supply is defined as positive electric power, the second control operations are preferably operations of controlling the electric power converter 33 such that the power supplies are discharged in descending order of the slope of Wout. That is, when Wout is defined as a negative value, the determination in step S21 of FIG. 5 is "determination as to whether the slope of Wout1 is "larger than or equal to" the slope of Wout2". In this case, when the slope of Wout1 is larger than or equal to the slope of Wout2, the operations of step S221 to step S226 are executed. On the other hand, when the slope of Wout1 is not larger than or equal to the slope of Wout2, the operations of step S231 to step S236 are executed. In order to execute the same determination operation irrespective of such definition of the sign of electric power, "the absolute value (that is, a value irrespective of the sign) of the slope of Wout" is preferably used as "the slope of Wout".

Figure 6:
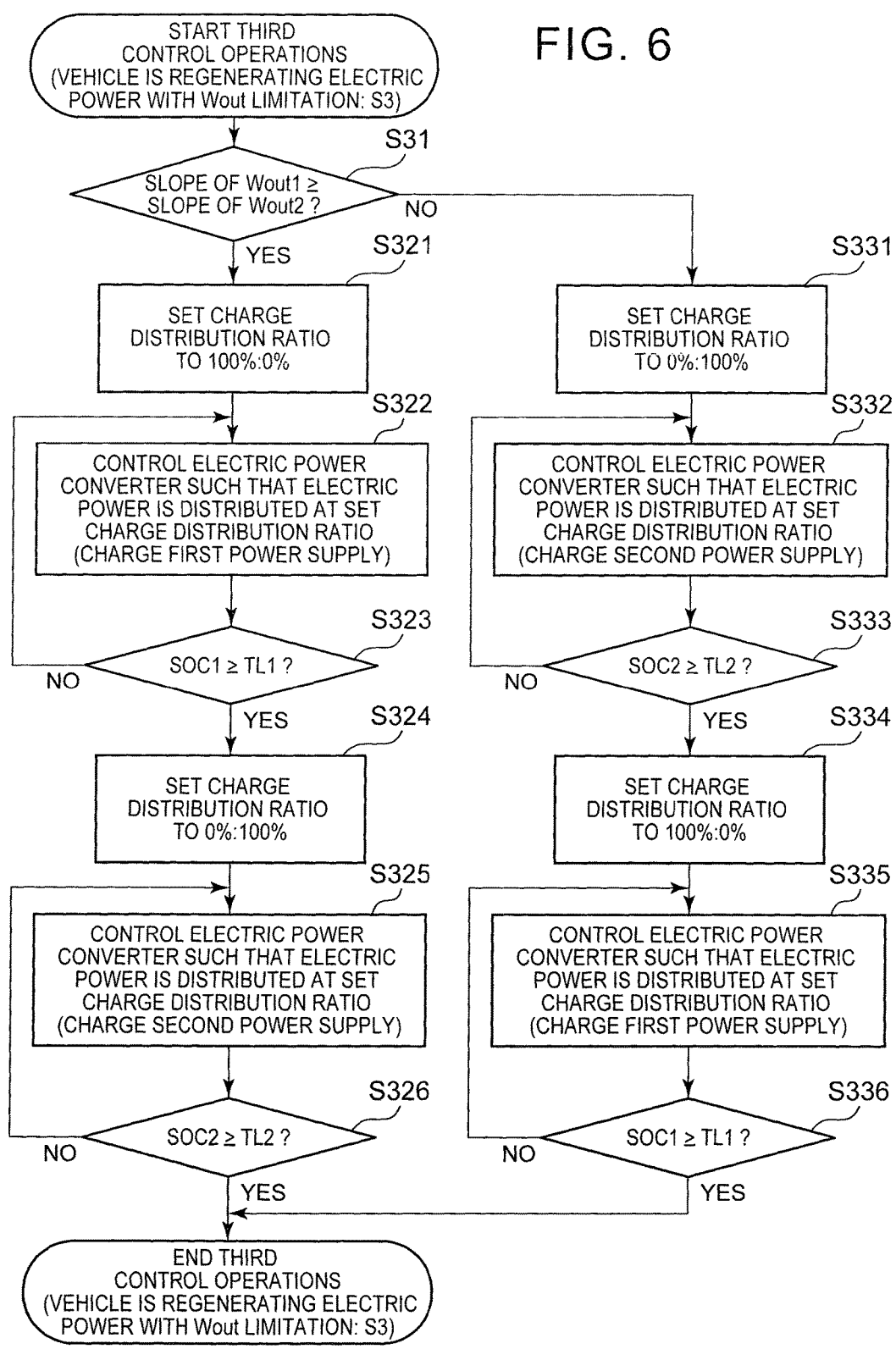
FIG. 6 is a flowchart that shows the flow of third control operations that are executed when the vehicle is regenerating electric power (that is, the first power supply and the second power supply are being charged) in a situation that Wout1 and Wout2 are limited.

Next, the flow of the third control operations that are executed when the vehicle 1 is regenerating electric power (that is, the first power supply 31 and the second power supply 32 are being charged) in a situation that Wout1 and Wout2 are limited will be described with reference to FIG. 6. FIG. 6 is a flowchart that shows the flow of the third control operations that are executed when the vehicle 1 is regenerating electric power in a situation that Wout1 and Wout2 are limited.

As shown in FIG. 6, the ECU 40 determines whether the slope of Wout1 is larger than or equal to the slope of Wout2 (step S31).

As a result of the determination of step S31, when it is determined that the slope of Wout1 is larger than or equal to the slope of Wout2 (Yes in step S31), the ECU 40 sets the charge distribution ratio to 100% (first power supply 31):0% (second power supply 32) (step S321). That is, the ECU 40 sets the charge distribution ratio such that (electric power that is charged into the first power supply 31):(electric power that is charged into the second power supply 32) becomes 100%:0%. In other words, the ECU 40 sets the charge distribution ratio such that the first power supply 31 having a relatively high (that is, the maximum) Wout is charged and the power supply other than the first power supply 31 (that is, the second power supply 32) is not charged.

After that, the ECU 40 controls the electric power converter 33 such that electric power is distributed at the charge distribution ratio set in step S321 (step S322). In this case, the first power supply 31 is charged, while the second power supply 32 is not charged. Such a distribution of electric power at the charge distribution ratio set in step S321 is continued (No in step S323) until SOC1 becomes higher than or equal to the lower limit value TL1.

After SOC1 becomes higher than or equal to the lower limit value TL1 (Yes in step S323), the ECU 40 sets the charge distribution ratio to 0% (first power supply 31):100% (second power supply 32) (step S324). That is, the ECU 40 sets the charge distribution ratio such that (electric power that is charged into the first power supply 31):(electric power that is charged into the second power supply 32) becomes 0%:100%. In other words, the ECU 40 sets the charge distribution ratio such that the second power supply 32 having a relatively low (that is, the second highest) Wout is charged and the power supply other than the second power supply 32 (that is, the first power supply 31) is not charged.

After that, the ECU 40 controls the electric power converter 33 such that electric power is distributed at the charge distribution ratio set in step S324 (step S325). In this case, the first power supply 31 is not charged, while the second power supply 32 is charged. Such a distribution of electric power at the charge distribution ratio set in step S324 is continued (No in step S326) until SOC2 becomes higher than or equal to the lower limit value TL2.

On the other hand, as a result of the determination of step S31, when it is determined that the slope of Wout1 is not larger than or equal to the slope of Wout2 (No in step S31), the ECU 40 sets the charge distribution ratio to 0% (first power supply 31):100% (second power supply 32) (step S331). That is, the ECU 40 sets the charge distribution ratio such that the second power supply 32 having a relatively high (that is, the maximum) Wout is charged and the power supply other than the second power supply 32 (that is, the first power supply 31) is not charged.

After that, the ECU 40 controls the electric power converter 33 such that electric power is distributed at the charge distribution ratio set in step S331 (step S332). In this case, the first power supply 31 is not charged, while the second power supply 32 is charged. Such a distribution of electric power at the charge distribution ratio set in step S331 is continued (No in step S333) until SOC2 becomes higher than or equal to the lower limit value TL2.

After SOC2 becomes higher than or equal to the lower limit value TL2 (Yes in step S333), the ECU 40 sets the charge distribution ratio to 100% (first power supply 31):0% (second power supply 32) (step S234). In other words, the ECU 40 sets the charge distribution ratio such that the first power supply 31 having a relatively low (that is, the second highest) Wout is charged and the power supply other than the first power supply 31 (that is, the second power supply 32) is not charged.

After that, the ECU 40 controls the electric power converter 33 such that electric power is distributed at the charge distribution ratio set in step S334 (step S335). In this case, the first power supply 31 is charged, while the second power supply 32 is not charged. Such a distribution of electric power at the charge distribution ratio set in step S334 is continued (No step S336) until SOC1 becomes higher than or equal to the lower limit value TL1.

In the above-described third control operations, when the slope of Wout1 is larger than or equal to the slope of Wout2, the electric power converter 33 is controlled such that the first power supply 31 is charged and then the second power supply 32 is charged. On the other hand, when the slope of Wout1 is not larger than or equal to the slope of Wout2, the electric power converter 33 is controlled such that the second power supply 32 is charged and then the first power supply 31 is charged. Therefore, the third control operations are considered as operations of controlling the electric power converter 33 such that the first power supply 31 and the second power supply 32 are charged in descending order of the slope of Wout. That is, in the present embodiment, when the first power supply 31 and the second power supply 32 are charged in a situation that Wout1 and Wout2 are limited, the electric power converter 33 is controlled such that the power supplies are charged in descending order of the slope of Wout.

However, the electric power converter 33 is controlled such that the power supplies are charged in descending order of the slope of Wout in the case where Wout is defined as a positive value. That is, the electric power converter 33 is controlled such that the power supplies are charged in descending order of the slope of Wout in the case where electric power that is discharged from each power supply is defined as positive electric power and electric power that is charged into each power supply is defined as negative electric power. If Wout is defined as a negative value, the third control operations are preferably operations of controlling the electric power converter 33 such that the power supplies are charged in ascending order of the slope of Wout. That is, when electric power that is discharged from each power supply, is defined as negative electric power and electric power that is charged into each power supply is defined as positive electric power, the third control operations are preferably operations of controlling the electric power converter 33 such that the power supplies are charged in ascending order of the slope of Wout. That is, when Wout is defined as a negative value, the determination in step S31 of FIG. 6 is "determination as to whether the slope of Wout1 is "smaller than or equal to" the slope of Wout2". In this case, when the slope of Wout1 is smaller than or equal to the slope of Wout2, the operations of step S321 to step S326 are executed. On the other hand, when the slope of Wout1 is not smaller than or equal to the slope of Wout2, the operations of step S331 to step S336 are executed. In order to execute the same determination operation irrespective of such definition of the sign of electric power, "the absolute value (that is, a value irrespective of the sign) of the slope of Wout" is preferably used as "the slope of Wout".

Figure 7:
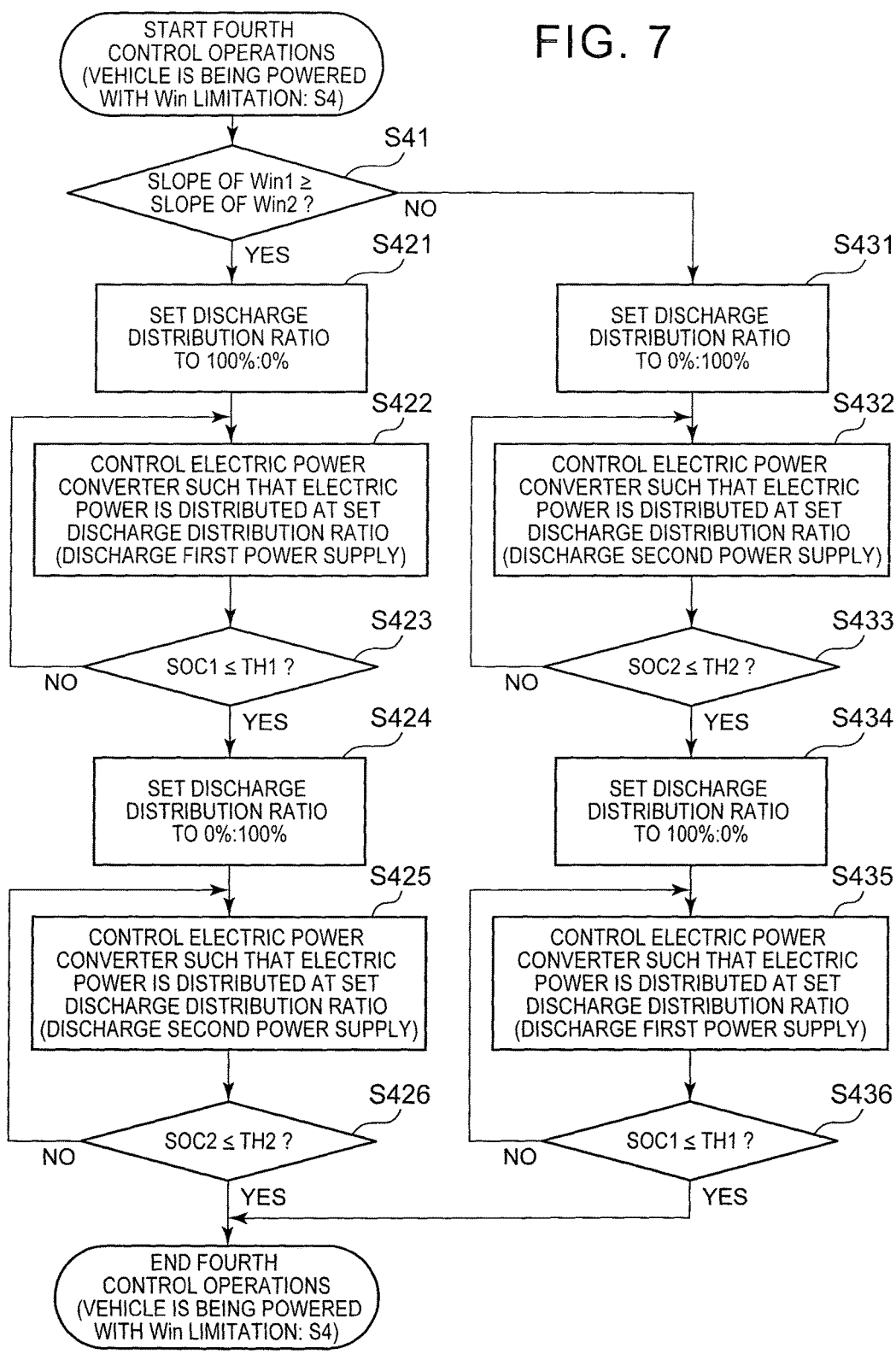
FIG. 7 is a flowchart that shows the flow of fourth control operations that are executed when the vehicle is carrying out powering (that is, the first power supply and the second power supply are being discharged) in a situation that Win1 and Win2 are limited.

Subsequently, the flow of the fourth control operations that are executed when the vehicle 1 is being powered (that is, the first power supply 31 and the second power supply 32 are being discharged) in a situation that Win1 and Win2 are limited will be described with reference to FIG. 7. FIG. 7 is a flowchart that shows the flow of the fourth control operations that are executed when the vehicle 1 is being powered in a situation that Win1 and Win2 are limited.

As shown in FIG. 7, the ECU 40 determines whether the slope of Win1 is larger than or equal to the slope of Win2 (step S41).

The slope of Win1 means the slope of the graph that represents the correlation between Win1 and SOC1, shown in FIG. 2A. Thus, the slope of Win1 means the rate of change in Win1 to SOC1. That is, the slope of Win1 means $\Delta Win1/\Delta SOC1$. In addition, the "slope of Win1" is the slope of Win1 in the region in which SOC1 is higher than or equal to the upper limit value TH1. That is, the "slope of Win1" is the slope of Win1 in the region in which Win1 is limited. This also applies to the slope of Win2.

The correlation between Win1 and SOC1 is a characteristic unique to each individual power supply. Thus, the ECU 40 preferably stores the correlation between Win1 and SOC1 (or information that directly or indirectly indicates the slope of Win1). This also applies to Win2.

As a result of the determination of step S41, when it is determined that the slope of Win1 is larger than or equal to the slope of Win2 (Yes in step S41), the ECU 40 sets the discharge distribution ratio to 100% (first power supply 31):0% (second power supply 32) (step S421). That is, the ECU 40 sets the discharge distribution ratio such that the first power supply 31 having a relatively high (that is, the maximum) Win is discharged and the power supply other than the first power supply 31 (that is, the second power supply 32) is not discharged.

After that, the ECU 40 controls the electric power converter 33 such that electric power is distributed at the discharge distribution ratio set in step S421 (step S422). In this case, the first power supply 31 is discharged, while the second power supply 32 is not discharged. Such a distribution of electric power at the discharge distribution ratio set in step S421 is continued (No in step S423) until SOC1 becomes lower than or equal to the upper limit value TH1.

After SOC1 becomes lower than or equal to the upper limit value TH1 (Yes in step S423), the ECU 40 sets the discharge distribution ratio to 0% (first power supply 31): 100% (second power supply 32) (step S424). That is, the ECU 40 sets the discharge distribution ratio such that the second power supply 32 having a relatively low (that is, the second highest) Win is discharged and the power supply other than the second power supply 32 (that is, the first power supply 31) is not discharged.

After that, the ECU 40 controls the electric power converter 33 such that electric power is distributed at the discharge distribution ratio set in step S424 (step S425). In this case, the first power supply 31 is not discharged, while the second power supply 32 is discharged. Such a distribution of electric power at the discharge distribution ratio set in step S424 is continued (No in step S426) until SOC2 becomes lower than or equal to the upper limit value TH2.

On the other hand, as a result of the determination of step S41, when it is determined that the slope of Win1 is not larger than or equal to the slope of Win2 (No in step S41), the ECU 40 sets the discharge distribution ratio to 0% (first power supply 30):100% (second power supply 32) (step S431). That is, the ECU 40 sets the discharge distribution ratio such that the second power supply 32 having a relatively high (that is, the maximum) Win is discharged and the power supply other than the second power supply 32 (that is, the first power supply 31) is not discharged.

After that, the ECU 40 controls the electric power converter 33 such that electric power is distributed at the discharge distribution ratio set in step S431 (step S432). In this case, the first power supply 31 is not discharged, while the second power supply 32 is discharged. Such a distribution of electric power at the discharge distribution ratio set in step S431 is continued (No in step S433) until SOC2 becomes lower than or equal to the upper limit value TH2.

After SOC2 becomes lower than or equal to the upper limit value TH2 (Yes in step S433), the ECU 40 sets the discharge distribution ratio to 100% (first power supply 31):0% (second power supply 32) (step S434). That is, the ECU 40 sets the discharge distribution ratio such that the first power supply 31 having a relatively low (that is, the second highest) Win is discharged and the power supply other than the first power supply 31 (that is, the second power supply 32) is not discharged.

After that, the ECU 40 controls the electric power converter 33 such that electric power is distributed at the discharge distribution ratio set in step S434 (step S435). In this case, the first power supply 31 is discharged, while the second power supply 32 is not discharged. Such a distribution of electric power at the discharge distribution ratio set in step S434 is continued (No in step S436) until SOC1 becomes lower than or equal to the upper limit value TH1.

In the above-described fourth control operations, when the slope of Win1 is larger than or equal to the slope of Win2, the electric power converter 33 is controlled such that the first power supply 31 is discharged and then the second power supply 32 is discharged. On the other hand, when the slope of Win1 is not larger than or equal to the slope of Win2, the electric power converter 33 is controlled such that the second power supply 32 is discharged and then the first power supply 31 is discharged. Therefore, the fourth control operations are considered as operations of controlling the electric power converter 33 such that the first power supply 31 and the second power supply 32 are discharged in descending order of the slope of Win. That is, in the present embodiment, when the first power supply 31 and the second power supply 32 are discharged in a situation that Win1 and Win2 are limited, the electric power converter 33 is controlled such that the power supplies are discharged in descending order of the slope of Win.

However, the electric power converter 33 is controlled such that the power supplies are discharged in descending order of the slope of Win in the case where Win is defined as a negative value. That is, the electric power converter 33 is controlled such that the power supplies are discharged in descending order of the slope of Win in the case where electric power that is discharged from each power supply is defined as positive electric power and electric power that is charged into each power supply is defined as negative electric power. If Win is defined as a positive value, the fourth control operations are preferably operations of controlling the electric power converter 33 such that the power supplies are discharged in ascending order of the slope of Win. That is, when electric power that is discharged from each power supply is defined as negative electric power and electric power that is charged into each power supply is defined as positive electric power, the fourth control operations are preferably operations of controlling the electric power converter 33 such that the power supplies are discharged in ascending order of the slope of Win. That is, when Win is defined as a positive value, the determination in step S41 of FIG. 7 is "determination as to whether the slope of Win1 is "smaller than or equal to" the slope of Win2". In this case, when the slope of Win1 is smaller than or equal to the slope of Win2, the operations of step S421 to step S425 are executed. On the other hand, when the slope of Win1 is not smaller than or equal to the slope of Win2, the operations of step S431 to step S435 are executed. In order to execute the same determination operation irrespective of such definition of the sign of electric power, "the absolute value (that is, a value irrespective of the sign) of the slope of Win" is preferably used as "the slope of Win".

Figure 8:
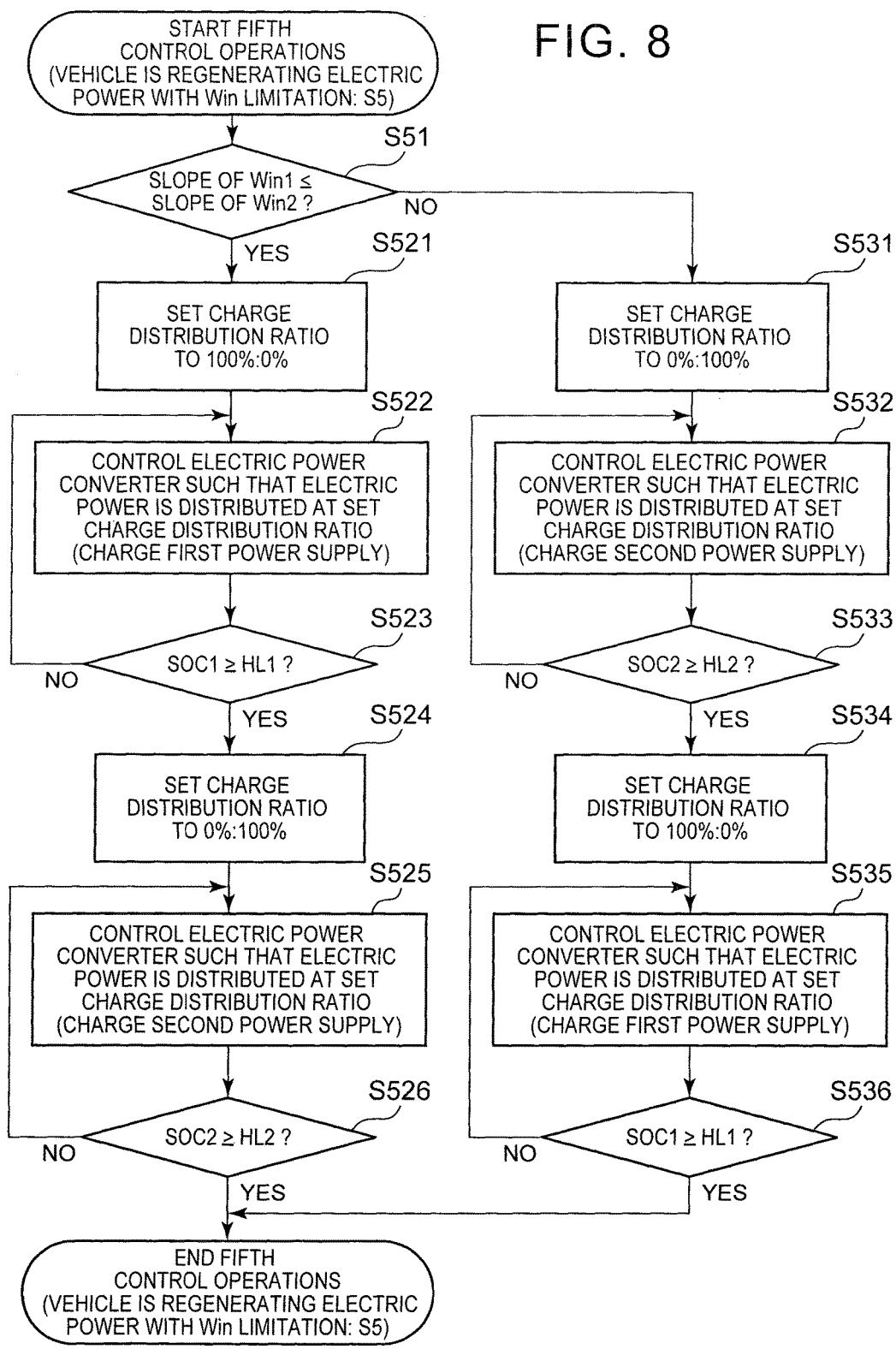
FIG. 8 is a flowchart that shows the flow of fifth control operations that are executed when the vehicle is regenerating electric power (that is, the first power supply and the second power supply are being charged) in a situation that Win1 and Win2 are limited.

Next, the flow of the fifth control operations that are executed when the vehicle 1 is regenerating electric power (that is, the first power supply 31 and the second power supply 32 are being charged) in a situation that Win1 and Win2 are limited will be described with reference to FIG. 8. FIG. 8 is a flowchart that shows the flow of the fifth control operations that are executed when the vehicle 1 is regenerating electric power in a situation that Win1 and Win2 are limited.

As shown in FIG. 8, the ECU 40 determines whether the slope of Win1 becomes smaller than or equal to the slope of Win2 (step S51).

As a result of the determination of step S51, when it is determined that the slope of Win1 is smaller than or equal to the slope of Win2 (Yes in step S51), the ECU 40 sets the charge distribution ratio to 100% (first power supply 31):0% (second power supply 32) (step S521). That is, the ECU 40 sets the charge distribution ratio such that the first power supply 31 having a relatively low (that is, the minimum) Win is charged and the power supply other than the first power supply 31 (that is, the second power supply 32) is not charged.

After that, the ECU 40 controls the electric power converter 33 such that electric power is distributed at the charge distribution ratio set in step S521 (step S522). In this case, the first power supply 31 is charged, while the second power supply 32 is not charged. Such a distribution of electric power at the charge distribution ratio set in step S521 is continued (No in step S523) until SOC1 becomes higher than or equal to the maximum upper limit value HL1.

After SOC1 becomes higher than or equal to the maximum upper limit value HL1 (Yes in step S523), the ECU 40 sets the charge distribution ratio to 0% (first power supply 31):100% (second power supply 32) (step S524). That is, the ECU 40 sets the charge distribution ratio such that the second power supply 32 having a relatively high (that is, the second lowest) Win is charged and the power supply other than the second power supply 32 (that is, the first power supply 31) is not charged.

After that, the ECU 40 controls the electric power converter 33 such that electric power is distributed at the charge distribution ratio set in step S524 (step S525). In this case, the first power supply 31 is not, charged, while the second power supply 32 is charged. Such a distribution of electric power at the charge distribution ratio set in step S524 is continued (No in step S526) until SOC2 becomes higher than or equal to the maximum upper limit value HL2.

On the other hand, as a result of the determination of step S51, when it is determined that the slope of Win1 is not smaller than or equal to the slope of Win2 (No in step S51), the ECU 40 sets the charge distribution ratio to 0% (first power supply 31):100% (second power supply 32) (step S531). That is, the ECU 40 sets the charge distribution ratio such that the second power supply 32 having a relatively low (that is, the minimum) Win is charged and the power supply other than the second power supply 32 (that is, the first power supply 31) is not charged.

After that, the ECU 40 controls the electric power converter 33 such that electric power is distributed at the charge distribution ratio set in step S531 (step S532). In this case, the first power supply 31 is not charged, while the second power supply 32 is charged. Such a distribution of electric power at the charge distribution ratio set in step S531 is continued (No in step S533) until SOC2 becomes higher than or equal to the maximum upper limit value HL2.

After SOC2 becomes higher than or equal to the maximum upper limit value HL2 (Yes in step S533), the ECU 40 sets the charge distribution ratio to 100% (first power supply 31):0% (second power supply 32) (step S534). In other words, the ECU 40 sets the charge distribution ratio such that the first power supply 31 having a relatively high (that is, the second lowest) Win is charged and the power supply other than the first power supply 31 (that is, the second power supply 32) is not charged.

After that, the ECU 40 controls the electric power converter 33 such that electric power is distributed at the charge distribution ratio set in step S534 (step S535). In this case, the first power supply 31 is charged, while the second power supply 32 is not charged. Such a distribution of electric power at the charge distribution ratio set in step S534 is continued (No in step S536) until SOC1 becomes higher than or equal to the maximum upper limit value HL1.

In the above-described fifth control operations, when the slope of Win1 is smaller than or equal to the slope of Win2, the electric power converter 33 is controlled such that the first power supply 31 is charged and then the second power supply 32 is charged. On the other hand, when the slope of Win1 is not smaller than or equal to the slope of Win2, the electric power converter 33 is controlled such that the second power supply 32 is charged and then the first power supply 31 is charged. Therefore, the fifth control operations are considered as operations of controlling the electric power converter 33 such that the first power supply 31 and the second power supply 32 are charged in ascending order of the slope of Win. That is, in the present embodiment, when the first power supply 31 and the second power supply 32 are charged in a situation that Win1 and Win2 are limited, the electric power converter 33 is controlled such that the power supplies are charged in ascending order of the slope of Win.

However, the electric power converter 33 is controlled such that the power supplies are charged in ascending order of the slope of Win in the case where Win is defined as a negative value. That is, the electric power converter 33 is controlled such that the power supplies are charged in ascending order of the slope of Win in the case where electric power that is discharged from each power supply is defined as positive electric power and electric power that is charged into each power supply is defined as negative electric power. If Win is defined as a positive value, the fifth control operations are preferably operations of controlling the electric power converter 33 such that the power supplies are charged in descending order of the slope of Win. That is, when electric power that is discharged from each power supply is defined as negative electric power and electric power that is charged into each power supply is defined as positive electric power, the fifth control operations are preferably operations of controlling the electric power converter 33 such that the power supplies are charged in descending order of the slope of Win. That is, when Win is defined as a negative value, the determination in step S51 of FIG. 8 is "determination as to whether the slope of Win1 is "larger than or equal to" the slope of Win2". In this case, when the slope of Win1 is larger than or equal to the slope of Win2, the operations of step S521 to step S525 are executed. On the other hand, when the slope of Win1 is not larger than or equal to the slope of Win2, the operations of step S531 to step S535 are executed. In order to execute the same determination operation irrespective of such definition of the sign of electric power, "the absolute value (that is, a value irrespective of the sign) of the slope of Win" is preferably used as "the slope of Win", as described in the description of the fourth control operations.

Next, the technical advantageous effects that are achieved by executing the second control operations to the fifth control operations will be described with reference to FIG. 9A to FIG. 12C.

Figure 9A:
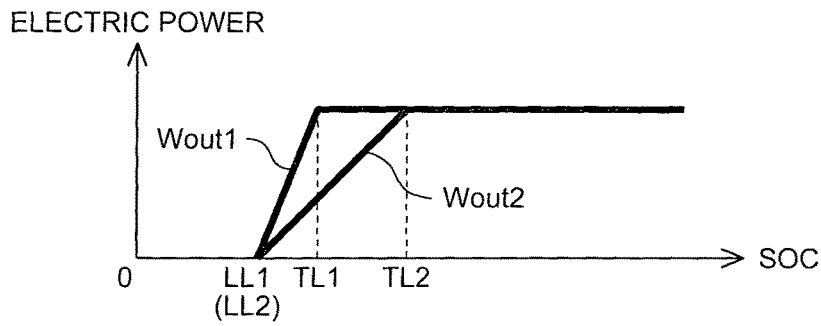
FIG. 9A to FIG. 9C are graphs that show a mode of change in SOC1 and SOC2 and a mode of change in total Wout of the overall power supply system when the second control operations are executed.
Figure 9B:
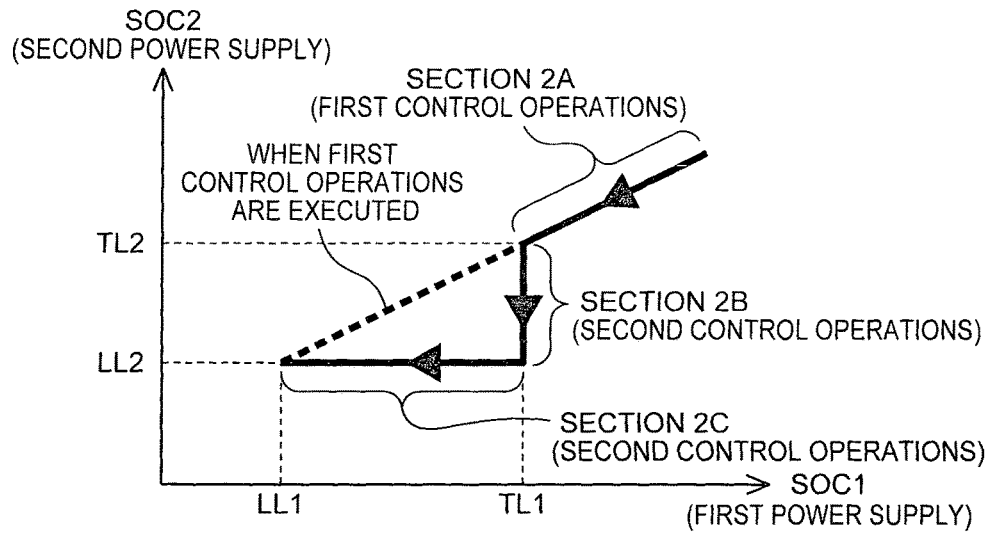
Figure 9C:
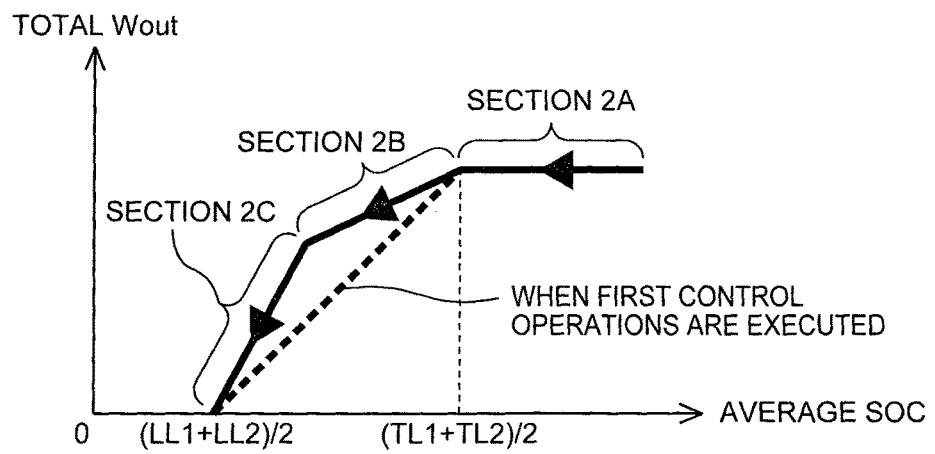

Initially, the technical advantageous effects that are achieved by the second control operations will be described with reference to FIG. 9A to FIG. 9C. FIG. 9A to FIG. 9C are graphs that show a mode of change in SOC1 and SOC2 and a mode of change in total Wout of the overall power supply system 30 when the second control operations are executed. Hereinafter, as shown in FIG. 9A, description will be made by focusing on the second control operations that are executed when the slope of Wout1 is larger than the slope of Wout2.

When Wout1 and Wout2 are not limited, the first control operations are executed. Therefore, as shown in FIG. 9B, as a result of a discharge of the first power supply 31 and the second power supply 32, the SOC1 and the SOC2 respectively reach the lower limit value TL1 and the lower limit value TL2 at the same time (see the section 2A in FIG. 9B). After that, when Wout1 and Wout2 are limited as a result of a discharge of the first power supply 31 and the second power supply 32, the second control operations are executed. Thus, initially, the second power supply 32 having the minimum slope of Wout is discharged, with the result that SOC2 decreases to the minimum lower limit value LL2 (see the section 2B in FIG. 9B). After that, the first power supply 31 having the second smallest slope of Wout is discharged, with the result that the SOC1 decreases to the minimum lower limit value LL1 (see the section 2C in FIG. 9B). On the other hand, if the first control operations are continued even after Wout1 and Wout2 are limited as a result of a discharge of the first power supply 31 and the second power supply 32, SOC1 and SOC2 decrease at the same time as indicated by the dashed line in FIG. 9B.

Total Wout (that is, Wout1+Wout2) of the overall power supply system 30 in the case where the second control operations are executed in this way is indicated by the continuous line in FIG. 9C. On the other hand, total Wout in the case where the first control operations are continuously executed instead of executing the second control operations is indicated by the dashed line in FIG. 9C. As shown in FIG. 9C, total Wout in the case where the second control operations are executed is improved particularly in the region in which Wout1 and Wout2 are limited as compared to total Wout in the case where the first control operations are continuously executed (that is, the absolute value of total Wout increases). This is because of the following reason.

Initially, when SOC is relatively low, Wout is gradually limited with a discharge. As shown in FIG. 9A, as the slope of Wout increases, Wout is limited at a relatively higher rate with a discharge. Therefore, in the present embodiment, the ECU 40 controls the power supply system 30 such that the power supply of which Wout is limited at a relatively low rate with a discharge (that is, the power supply having a relatively small slope of Wout, and the second power supply 32 in FIG. 9A to FIG. 9C) is discharged preferentially or in first. On the other hand, in a comparative embodiment in which the first control operations are constantly executed without consideration of the slope of Wout, not only the power supply of which Wout is limited at a relatively low rate with a discharge is discharged but also the power supply of which Wout is limited at a relatively high rate with a discharge (that is, the power supply having a relatively large slope of Wout, and the first power supply 31 in FIG. 9A to FIG. 9C) is also discharged at the same time. Therefore, in the present embodiment, in comparison with the comparative embodiment in which the first control operations are constantly executed without consideration of the slope of Wout, the power supply system 30 is controlled such that total Wout is relatively difficult to be limited.

In order to control the power supply system 30 such that total Wout is difficult to be limited in comparison with the comparative embodiment in which the first control operations are constantly executed without consideration of the slope of Wout, the discharge distribution ratio that is set in the second control operations may not necessarily be 100%: 0% (0%:100%). For example, in the second control operations, the discharge distribution ratio may be set such that the discharge distribution ratio of the power supply having a smaller slope of Wout increases and the discharge distribution ratio of the power supply having a larger slope of Wout decreases with reference to the discharge distribution ratio (R1:R2) that is set in the first control operations. Specifically, for example, when Slope of Wout1≤Slope of Wout2, the discharge distribution ratio may be set to R21 (where R21>R1):R22 (where R22<R2). On the other hand, for example, when Slope of Wout1>Slope of Wout2, the discharge distribution ratio may be set to R23 (where R23<R1): R24 (where R24>R2).

Figure 10A:
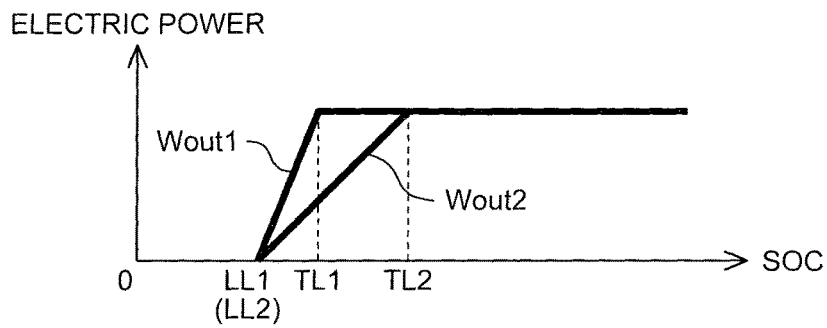
FIG. 10A to FIG. 10C are graphs that show a mode of change in SOC1 and SOC2 and a mode of change in total Wout of the overall power supply system when the third control operations are executed.
Figure 10B:
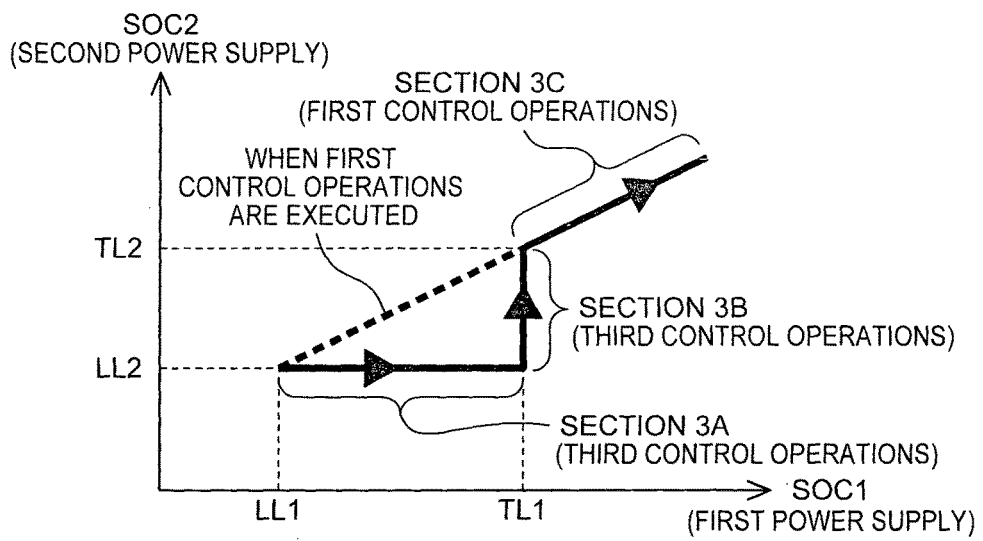
Figure 10C:
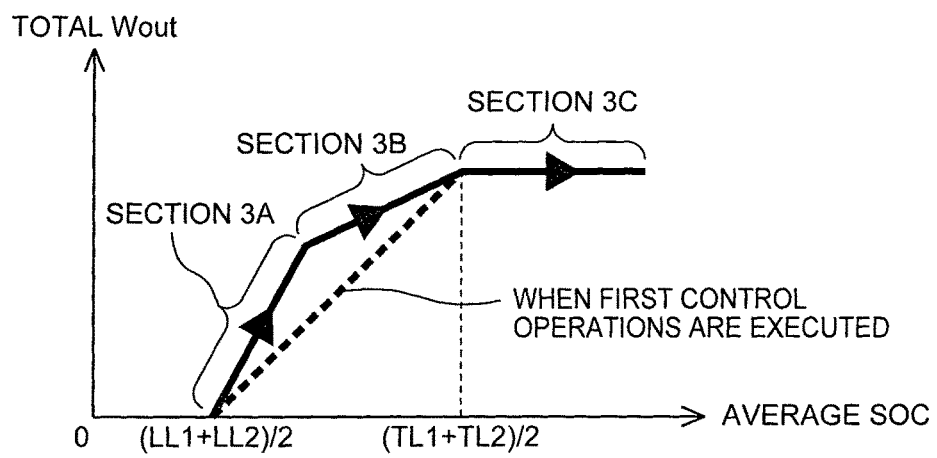

Next, the technical advantageous effects that are achieved by the third control operations will be described with reference to FIG. 10A to FIG. 10C. FIG. 10A to FIG. 10C are graphs that show a mode of change in SOC1 and SOC2 and a mode of change in total Wout of the overall power supply system 30 when the third control operations are executed. Hereinafter, as shown in FIG. 10A, description will be made by focusing on the third control operations that are executed when the slope of Wout1 is larger than the slope of Wout2.

When Wout1 and Wout2 are limited, the third control operations are executed. Thus, initially, the first power supply 31 having the maximum slope of Wout is charged, with the result that SOC1 increases to the lower limit value TL1 (see the section 3A in FIG. 10B). After that, the second power supply 32 having the second largest slope of Wout is charged, with the result that SOC2 increases to the lower limit value TL2 (see the section. 3B in FIG. 10B). On the other hand, if the first control operations are executed even when Wout1 and Wout2 are limited, SOC1 and SOC2 increase at the same time as indicated by the dashed line in FIG. 10B. After that, when Wout1 and Wout2 are not limited as a result of a charge of the first power supply 31 and the second power supply 32, the first control operations are executed. Therefore, as shown in FIG. 10B, the first power supply 31 and the second power supply 32 are charged such that SOC1 and SOC2 respectively reach the upper limit value TH1 and the upper limit value TH2 at the same time (see the section 3C in FIG. 10B).

Total Wout (that is, Wout1+Wout2) of the overall power supply system 30 in the case where the third control operations are executed in this way is indicated by the continuous line in FIG. 10C. On the other hand, total Wout in the case where the first control operations are continuously executed instead of executing the third control operations is indicated by the dashed line in FIG. 10C. As shown in FIG. 10C, total Wout in the case where the third control operations are executed is improved particularly in the region in which Wout1 and Wout2 are limited as compared to total Wout in the case where the first control operations are continuously executed (that is, the absolute value of total Wout increases). This is because of the following reason.

When SOC is relatively low, Wout gradually recovers with a charge. As shown in FIG. 10A, as the slope of Wout increases, Wout recovers at a relatively higher rate with a charge. Therefore, in the present embodiment, the ECU 40 controls the power supply system 30 such that the power supply of which Wout recovers at a relatively high rate with a charge (that is, the power supply having a relatively large slope of Wout, and the first power supply 31 in FIG. 10A to FIG. 10C) is charged preferentially or in first. On the other hand, in the comparative embodiment in which the first control operations are constantly executed without consideration of the slope of Wout, not only the power supply of which Wout recovers at a relatively high rate with a charge is charged but also the power supply of which Wout recovers at a relatively low rate with a charge (that is, the power supply having a relatively small slope of Wout, and the second power supply 32 in FIG. 10A to FIG. 10C) is also charged at the same time. Therefore, in the present embodiment, in comparison with the comparative embodiment in which the first control operations are constantly executed without consideration of the slope of Wout, the power supply system 30 is controlled such that total Wout is relatively difficult to be limited.

In order to control the power supply system 30 such that total Wout is difficult to be limited in comparison with the comparative embodiment in which the first control operations are constantly executed without consideration of the slope of Wout, the charge distribution ratio that is set in the third control operations may not necessarily be 100%:0% (0%:100%). For example, in the third control operations, the charge distribution ratio may be set such that the charge distribution ratio of the power supply having a larger slope of Wout increases and the charge distribution ratio of the power supply having a smaller slope of Wout decreases with reference to the charge distribution ratio (C1:C2) that is set in the first control operations. Specifically, for example, when Slope of Wout1≥Slope of Wout2, the charge distribution ratio may be set to C31 (where C31>C1):C32 (where C32<C2). On the other hand, for example, when Slope of Wout1<Slope of Wout2, the charge distribution ratio may be set to C33 (where C33<C1):C34 (where C34>C2).

Figure 11A:
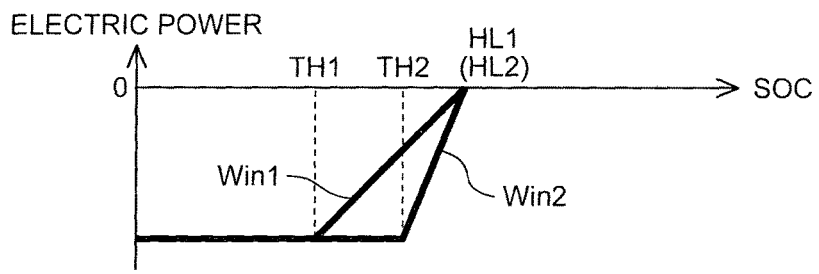
FIG. 11A to FIG. 11C are graphs that show a mode of change in SOC1 and SOC2 and a mode of change in total Win of the overall power supply system when the fourth control operations are executed.
Figure 11B:
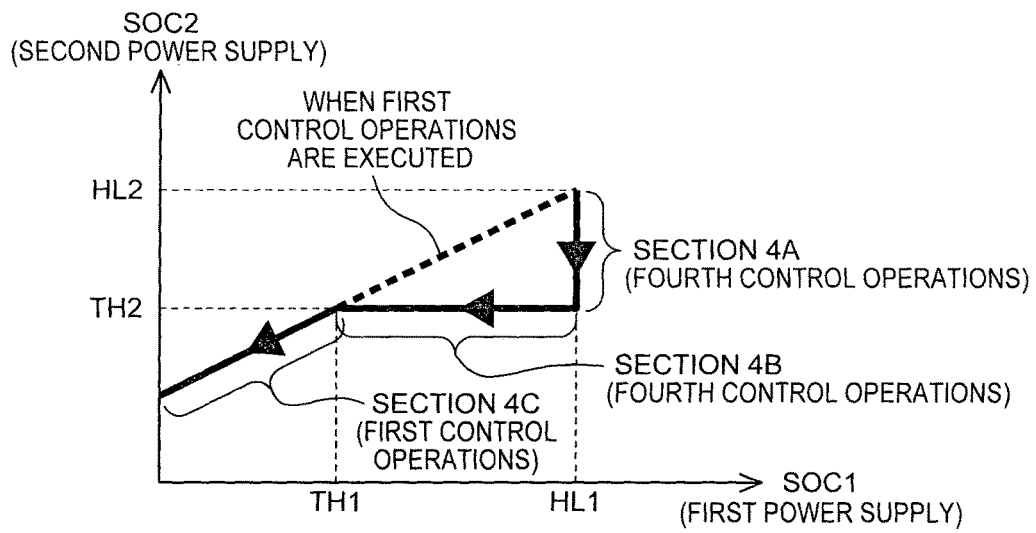
Figure 11C:
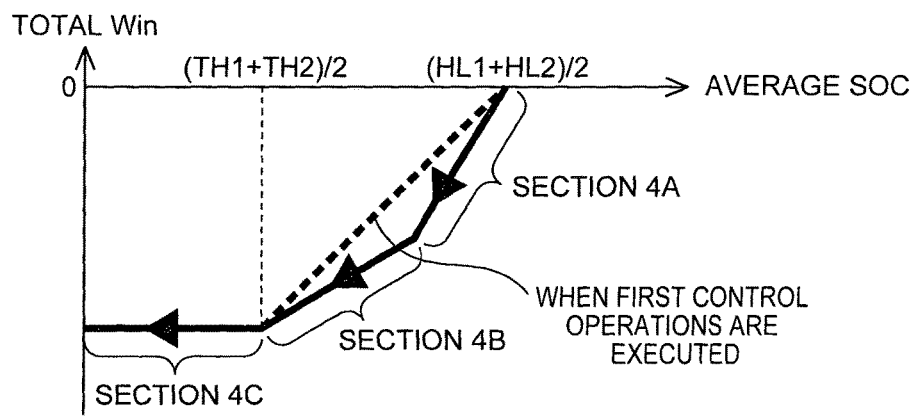

Next, the technical advantageous effects that are achieved by the fourth control operations will be described with reference to FIG. 11A to FIG. 11C. FIG. 11A to FIG. 11C are graphs that show a mode of change in SOC1 and SOC2 and a mode of change in total Win of the overall power supply system 30 when the fourth control operations are executed. Hereinafter, as shown in FIG. 11A, description will be made by focusing on the fourth control operations that are executed when the slope of Win1 is smaller than the slope of Win2.

When Win1 and Win2 are limited, the fourth control operations are executed. Thus, initially, the second power supply 32 having the maximum slope of Win is discharged, with the result that SOC2 decreases to the upper limit value TH2 (see the section 4A in FIG. 11B). After that, the first power supply 31 having the second largest Win is discharged, with the result that SOC1 decreases to the upper limit value TH1 (see the section 4B in FIG. 11B). On the other hand, if the first control operations are executed even when Win1 and Win2 are limited, SOC1 and SOC2 decrease at the same time as indicated by the dashed line in FIG. 11B. After that, when Win1 and Win2 are not limited with a discharge of the first power supply 31 and the second power supply 32, the first control operations are executed. Therefore, as shown in FIG. 11B, the first power supply 31 and the second power supply 32 are discharged such that SOC1 and SOC2 respectively reach the lower limit value TL1 and the lower limit value TL2 at the same time (see the section 4C in FIG. 11B).

Total Win (that is, Win1+Win2) of the overall power supply system 30 in the case where the fourth control operations are executed in this way is indicated by the continuous line in FIG. 11C. On the other hand, total Win in the case where the first control operations are continuously executed instead of executing the fourth control operations is indicated by the dashed line in FIG. 11C. As shown in FIG. 11C, total Win in the case where the fourth control operations are executed is improved particularly in the region in which Win1 and Win2 are limited as compared to total Win in the case where the first control operations are continuously executed (that is, the absolute value of total Win increases). This is because of the following reason.

When SOC is relatively high, Win gradually recovers with a discharge. As shown in FIG. 11A, as the slope of Win increases, Win recovers at a relatively higher rate with a discharge. Therefore, in the present embodiment, the ECU 40 controls the power supply system 30 such that the power supply of which Win recovers at a relatively high rate with a discharge (that is, the power supply having a relatively large slope of Win, and the second power supply 32 in FIG. 11A to FIG. 11C) is discharged preferentially or in first. On the other hand, in a comparative embodiment in which the first control operations are constantly executed without consideration of the slope of Win, not only the power supply of which Win recovers at a relatively high rate with a discharge but also the power supply of which Win recovers at a relatively low rate with a discharge (that is, the power supply having a relatively small slope of Win, and the first power supply 31 in FIG. 11A to FIG. 11C) is also discharged at the same time. Therefore, in the present embodiment, in comparison with the comparative embodiment in which the first control operations are constantly executed without consideration of the slope of Win, the power supply system 30 is controlled such that total Win is relatively difficult to be limited.

In order to control the power supply system 30 such that total Win is difficult to be limited in comparison with the comparative embodiment in which the first control operations are constantly executed without consideration of the slope of Win, the discharge distribution ratio that is set in the fourth control operations may not necessarily be 100%:0% (0%:100%). For example, in the fourth control operations, the discharge distribution ratio may be set such that the discharge distribution ratio of the power supply having a larger slope of Win increases and the discharge distribution ratio of the power supply having a smaller slope of Win decreases with reference to the discharge distribution ratio (R1:R2) that is set in the first control operations. Specifically, for example, when Slope of Win1≥Slope of Win2, the discharge distribution ratio may be set to R41 (where R41>R1):R42 (where R42<R2). On the other hand, for example, when Slope of Win1<Slope of Win2, the discharge distribution ratio may be set to R43 (where R43<R1):R44 (where R44>R2).

Figure 12A:
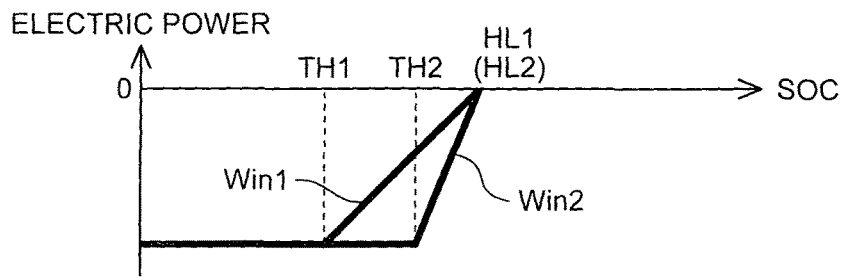
FIG. 12A to FIG. 12C are graphs that show a mode of change in SOC1 and SOC2 and a mode of change in total Win of the overall power supply system when the fifth control operations are executed.
Figure 12B:
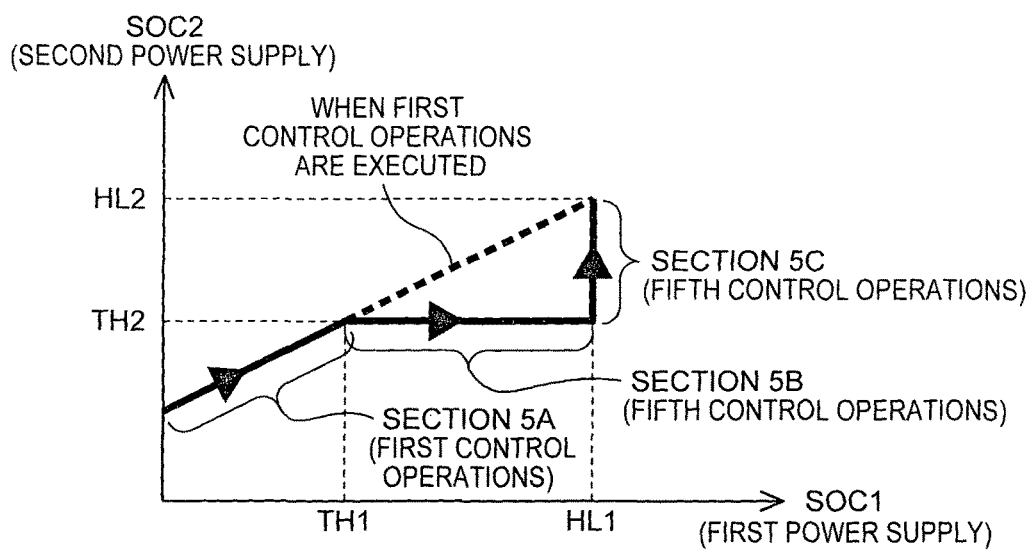
Figure 12C:
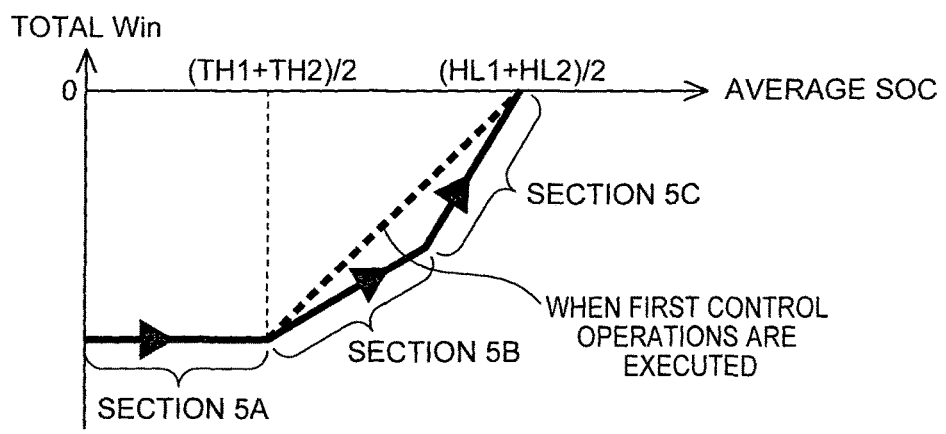

Next, the technical advantageous effects that are achieved by the fifth control operations will be described with reference to FIG. 12A to FIG. 12C. FIG. 12A to FIG. 12C are graphs that show a mode of change in SOC1 and SOC2 and a mode of change in total Win of the overall power supply system 30 when the fifth control operations are executed. Hereinafter, as shown in FIG. 12A, description will be made by focusing on the fifth control operations that are executed when the slope of Win1 is smaller than the slope of Win2.

When Win1 and Win2 are not limited, the first control operations are executed. Therefore, as shown in FIG. 12B, as a result of a charge of the first, power supply 31 and the second power supply 32, SOC1 and SOC2 respectively reach the upper limit value TH1 and the upper limit value TH2 at the same time (see the section 5A in FIG. 12B). After that, when Win1 and Win2 are limited with a charge of the first power supply 31 and the second power supply 32, the fifth control operations are executed. Thus, initially, the first power supply 31 having the minimum slope of Win is charged, with the result that SOC1 increases to the maximum upper limit value HL1 (see the section 5B in FIG. 12B). After that, the second power supply 32 having the second smallest slope of Wout is charged, with the result that SOC2 increases to the maximum upper limit value HL2 (see the section 5C in FIG. 12B). On the other hand, if the first control operations are executed even after Win1 and Win2 are limited with a charge of the first power supply 31 and the second power supply 32, SOC1 and SOC2 increase at the same time as indicated by the dashed line in FIG. 12B.

Total Win (that is, Win1+Win2) of the overall power supply system 30 in the case where the fifth control operations are executed in this way is indicated by the continuous line in FIG. 12C. On the other hand, total Win in the case where the first control operations are continuously executed instead of executing the fifth control operations is indicated by the dashed line in FIG. 12C. As shown in FIG. 12C, total Win in the case where the fifth control operations are executed is improved particularly in the region in which Win1 and Win2 are limited as compared to total Win in the case where the first control operations are continuously executed that is, the absolute value of total Win increases). This is because of the following reason.

Initially, when SOC is relatively high, Win is gradually limited with a charge. As shown in FIG. 12A, as the slope of Win increases, Win is limited at a relatively higher rate with a charge. Therefore, in the present embodiment, the ECU 40 controls the power supply system 30 such that the power supply of which Win is limited at a relatively low rate with a charge (that is, the power supply having a relatively small slope of Win, and the first power supply 31 in FIG. 12A to FIG. 12C) is charged preferentially or in first. On the other hand, in a comparative embodiment in which the first control operations are constantly executed without consideration of the slope of Win, not only the power supply of which Win is limited at a relatively low rate with a charge but also the power supply of which Win is limited at a relatively high rate with a charge (that is, the power supply having a relatively large slope of Win, and the second power supply 32 in FIG. 12A to FIG. 12C) is also charged at the same time. Therefore, in the present embodiment, in comparison with the comparative embodiment in which the first control operations are constantly executed without consideration of the slope of Win, the power supply system 30 is controlled such that total Win is relatively difficult to be limited.

In order to control the power supply system 30 such that total Win is difficult to be limited in comparison with the comparative embodiment in which the first control operations are constantly executed without consideration of the slope of Win, the charge distribution ratio that is set in the fifth control operations may not necessarily be 100%:0% (0%:100%). For example, in the fifth control operations, the charge distribution ratio may be set such that the charge distribution ratio of the power supply having a smaller slope of Win increases and the charge distribution ratio of the power supply having a larger slope of Win decreases with reference to the charge distribution ratio (C1:C2) that is set in the first control operations. Specifically, for example, when Slope of Win1≤Slope of Win2, the charge distribution ratio may be set to C51 (where C51>C1):C52 (where C52<C2). On the other hand, for example, when Slope of Win1>Slope of Win2, the charge distribution ratio may be set to C53 (where C53<C1):C54 (where C54>C2).

The invention may be modified as needed without departing from the scope or idea of the invention that can be read from the appended claims and the specification, and the technical idea of the invention also encompasses power supply control apparatuses having such modifications.

What is claimed is:

1. A power supply system comprising:
a plurality of electrical storage devices;
a distributor configured to distribute electric power between the plurality of electrical storage devices in a desired distribution mode; and
an electronic control unit configured to
(i) set the desired distribution mode based on at least one of a magnitude relation between first rates of change in dischargeable power of the corresponding electrical storage device to a charge state value indicating a remaining level of charge of the corresponding electrical storage device, or a magnitude relation between second rates of change in chargeable power of the corresponding electrical storage device to the charge state value, and
(ii) control the distributor such that electric power is distributed in the set distribution mode.

2. The power supply system according to claim 1, wherein the electronic control unit is configured to
(a) when a current charge state value of each electrical storage device is lower than or equal to a first threshold in a discharge situation that each electrical storage device is discharged, set the distribution mode such that an allocation of electric power that is discharged from one of the plurality of electrical storage devices, which has a relatively low first rate of change, is large, as compared to the allocation of electric power that is discharged from the one of the plurality of electrical storage devices when the current charge state value of each electrical storage device is higher than the first threshold in the discharge situation, and
(b) when the current charge state value of each electrical storage device is higher than or equal to a second threshold higher than the first threshold in the discharge situation, set the distribution mode such that an allocation of electric power that is discharged from one of the plurality of electrical storage devices, which has a relatively high second rate of change, is large, as compared to the allocation of electric power that is discharged from the one of the plurality of electrical storage devices when the current charge state value of each electrical storage device is lower than the second threshold in the discharge situation.

3. The power supply system according to claim 1, wherein the electronic control unit is configured to
(I) when a current charge state value of each electrical storage device is lower than or equal to a first threshold in a charge situation that each electrical storage device is being charged, set the distribution mode such that an allocation of electric power that is charged into one of the plurality of electrical storage devices, which has a relatively high first rate of change, is large, as compared to the allocation of electric power that is charged into the one of the plurality of electrical storage devices when the current charge state value of each electrical storage device is higher than the first threshold in the charge situation, and
(II) when the current charge state value of each electrical storage device is higher than or equal to a second threshold higher than the first threshold in the charge situation, set the distribution mode such that an allocation of electric power that is charged into one of the plurality of electrical storage devices, which has a relatively low second rate of change, is large, as compared to the allocation of electric power that is charged into the one of the plurality of electrical storage devices when the current charge state value of each electrical storage device is lower than the second threshold in the charge situation.

4. The power supply system according to claim 1, wherein the electronic control unit is configured to set the distribution mode such that the plurality of electrical storage devices are charged or discharged in descending order of the first rate of change, or are charged or discharged in ascending order of the first rate of change.

5. The power supply system according to claim 1, wherein the electronic control unit is configured to set the distribution mode such that the plurality of electrical storage devices are charged or discharged in descending order of the second rate of change, or are charged or discharged in ascending order of the second rate of change.

6. The power supply system according to claim 1, wherein the electronic control unit is configured to
(1) set the distribution mode such that the plurality of electrical storage devices are discharged in ascending order of the first rate of change, when a current charge state value of each electrical storage device is lower than or equal to a first threshold in a discharge situation that each electrical storage device is being discharged, and
(2) set the distribution mode such that the plurality of electrical storage devices are discharged in descending order of the second rate of change, when the current charge state value of each electrical storage device is higher than or equal to a second threshold higher than the first threshold in the discharge situation.

7. The power supply system according to claim 1, wherein the electronic control unit is configured to
(i) set the distribution mode such that the plurality of electrical storage devices are charged in descending order of the first rate of change, when a current charge state value of each electrical storage device is lower than or equal to a first threshold in a charge situation that each electrical storage device is being charged, and
(ii) set the distribution mode such that the plurality of electrical storage devices are charged in ascending order of the second rate of change, when the current charge state value of each electrical storage device is higher than or equal to a second threshold higher than the first threshold in the charge situation.

* * * * *